United States Patent [19]
Lem et al.

[11] Patent Number: 5,167,876
[45] Date of Patent: Dec. 1, 1992

[54] FLAME RESISTANT BALLISTIC COMPOSITE

[75] Inventors: Kwok W. Lem, Randolph; Hong B. Chin, Parsippany; Young D. Kwon, Mendham; Dusan C. Prevorsek, Morristown; Hsin L. Li, Parsippany, all of N.J.

[73] Assignee: Allied-Signal Inc., Morristown, N.J.

[21] Appl. No.: 623,638

[22] Filed: Dec. 7, 1990

[51] Int. Cl.$^5$ .................................................. C09K 2/10
[52] U.S. Cl. ..................................... 252/602; 252/609; 428/911; 428/912
[58] Field of Search ................ 252/602, 609; 428/224, 428/911, 912

[56] References Cited

U.S. PATENT DOCUMENTS

| | | | |
|---|---|---|---|
| 4,403,012 | 9/1983 | Harpell et al. | 428/290 |
| 4,413,110 | 11/1983 | Kavesh et al. | 526/348.1 |
| 4,457,985 | 7/1984 | Harpell et al. | 428/224 |
| 4,543,286 | 9/1985 | Harpell et al. | 428/288 |
| 4,594,290 | 6/1986 | Fischer et al. | 428/212 |
| 4,613,535 | 9/1986 | Harpell et al. | 428/113 |
| 4,623,574 | 11/1986 | Harpell et al. | 428/113 |
| 4,650,710 | 3/1987 | Harpell et al. | 428/263 |
| 4,681,792 | 7/1987 | Harpell et al. | 428/102 |
| 4,737,401 | 4/1988 | Harpell et al. | 428/252 |
| 4,737,402 | 4/1988 | Harpell et al. | 428/252 |
| 4,868,040 | 9/1989 | Hallal et al. | 428/251 |
| 4,916,000 | 4/1990 | Li et al. | 428/105 |
| 5,006,293 | 4/1991 | Hartman et al. | 428/911 X |

OTHER PUBLICATIONS

J. Macromol. Sci.-Chem., A7(1), pp. 295-322 (1973), R. C. Laible and F. Figucia.

Primary Examiner—Peter A. Nelson
Attorney, Agent, or Firm—R. C. Stewart, II; G. H. Fuchs; D. L. Webster

[57] ABSTRACT

This invention relates to a fire retardant compound comprising at least one fibrous layer comprising a network of fibers such as high strength polyethylene or aramid fibers in a matrix such as a blend of a vinyl ester and a polyurethane, and a fire retardant layer comprised of a particulate fire retardant material which decompose an heating to a gaseous material such as magesium hydroxide dispersed in a matrix comprised of relatively high char yield resin such as cured phenolic cyanate resin.

47 Claims, 1 Drawing Sheet

FLAME RESISTANT BALLISTIC COMPOSITE

BACKGROUND OF THE INVENTION

1. Field of the Invention

This invention relates to flame resistant articles. More particularly, this invention relates to ballistic or impact resistant articles having improved flame resistance.

2. Prior Art

Ballistic articles such as bulletproof vests, helmnets, structural members of helicopters and other military equipment, vehicle panels, briefcases, raincoats and umbrellas containing high strength fibers are known. Fibers conventionally used include aramide fibers such as poly(phenylenediamine terephthalamide), graphite fibers, nylon fibers, ceramic fibers, glass fibers and the like. For many applications, such as vests or parts of vests, the fibers are used in a woven or knitted fabirc. For many of the applications, the fibers anre encapsulted or embedded in a matrix material.

In "The Application of High Modulus Fibers to Ballistic Protection", R. C. Laible et al., *J. Macromol. Sci.-Chem.*, A7(1), pp. 295-322, 1973, it is indicated ono p. 298 that a fourth requirement is that the textile material have a high degree of heat resistance. In an NTIS publication, AD-A018 958 "New Materials in Construction for Improved Helmets", A. L. Alesi et al., a multilayer highly oriented polypropylene film material (without matrix), referred to as "XP", was evaluated against an aramid fiber (with a phenolic/polyvinyl butyral resin matrix. The aramid system was judged to have the most promising combination of superior performance and a minimum of problems for combat helmet development.

U.S. Pat. Nos. 4,403,012 and 4,457,985 disclose ballistic resistant composite articles comprised of networks of high molecular wight polyethylene or polypropylene fibers, and matrices composed of olefin polymers and copolymers, unsaturated polyester resins, epoxy resings, and other resins curable below the melting point of the fiber.

A. L. Lastnik, et al., "The Effect of Resin Concentration and Laminating Pressures of KEVLAR Fabric Bonded with Modified Phenolic Resin", Tech. Report NATICK/TR-84/030, Jun. 8, 1984; disclose that an interestitial resin, which encapsulates and bonds the fibers of a fabric, reduces the ballistic resistance of the result composite article.

U.S. Pat. Nos. 4,623,574 and 4,748,064 disclose a simple composite structure comprising high strength fibers embedded in an elasomeric matrix. The simple composite structure exhibits outstanding ballistic protection as compared to simple composites utilizng rigid matrices, the result of which are disclosed in the patent. Particularly effective are simple composites utilizing rigid matrices, the result of which are disclosed in the patents. Particularly effective are simple composites employing ultra-high molecular weight polyethylene and polypropylene such as disclosed in U.S. Pat. No. 4,413,110.

U.S. Pat. Nos. 4,737,402 and 4,613,535 disclose complex rigid composite articles having improved impact resistance which comprise a network of high strength fibers such as the ultra-high molecular weight polyethylene and polypropylene disclosed in U.S. Pat. No. 4,413,110 embedded in an elasomeric material and at least one additional rigid layer on a major surface of the fibers in the matrix. It is disclosed that the composites have improved resistance to environmental hazards, improved impact resistance and are unexpectedly effective as ballistic resistant articles such as armor.

U.S. Pat. No. 4,650,710 discloses a ballistic resistant fabric article which comprises at least one network of fibers selected from the group consisting of extended chain polyethylene, polypropylene, polyvinyl alcohol and polyacrylonitrile fibers coated with a low modulus elastomeric material.

U.S. Pat. No. 4,681,792 discloses a flexible article of manufacture comprising a plurality of first flexible layers arranged in a first portion of the article, each of said first layers consisting essentially of fibers having a tensile modulus of at least about 300 g/denier and a tenacity of at least about 15 g denier and a plurality of second flexible layers arranged in a second portion of said article, each of said second flexible layers comprising fibers, the resistance to displacement of fibers in each of said second flexible layers being greater than the resistance to displacement in each of said first flexible layers.

U.S. Pat. No. 4,543,286 discloses a ballistic-resistant fabric article of manufacture comprising at least one network of extended chain polyolefin fibers selected from the group consisting of extended chain polyethylene and extended chain polypropylene fibers in a matrix, the fibers are coated with at least 0.01 to 200% of a polymer having ethylene or propylene crystallinity.

U.S. Pat. No. 4,916,000 discloses a composite of at least one layer which comprises a network of filaments in a matrix, wherein that ratio of thickness of the layer to filament diameter is less than about 12.8.

U.S. Pat. No. 4,737,401 discloses composites of polyethylene, polyperopylene, polyvinyl alcohol and polyacrylonitrile of low denier (under 500) and low tensile modulus-(200 grams/denier).

U.S. Pat. No. 4,868,040 discloses the use of $Al(OH)_3$ as a flame retardant in vinyl ester resin matrixes to reduce smoke production and to enhance flame retardancy of the armor composite.

Fire retardant compositions are known. For example, A. H. Landrocki, "Handbood of Plastic Flammabiltiy Fuel and combustion Toxicology," (Noyes Publication, 1983) disclosures the basic front line of fire/flame retardants. Basically, flame retardants for plastics function under heat to yield products that would be more difficult to ignite than the virgin plastics, or that do not propagate flame as readily. They function in one or more ways. For example, they absorb heat, thereby making sustained burning more difficult, and they form nonflammable char or coating that insulates the substrate from the heat, excludes oxygen, and slows the rate of diffusion of volatile, flammable pyrolysis fragments from the substrate. Flame retardants for plastics may also function by enhancing the decompositon of the substrate, thereby accelerating its melting al lower temperatures so that it drips or flows away from the flame front and by evolving products that stop or slow flame propagation. Still other flame retardants for plastics may function by forming free radicals that convert a polymer to less combustible products and by excluding oxygen from possible burning sites by coating resin particles.

Fire-retardant chemicals available commercially for plastics can be divided into two general classes, unreactive additives and reactive monomers or crosslinking agents. The unreactive additives are generally added to the polymer during processing, but do not react chemically with the other constituents of the composition.

The reactive types, on the other hand, chemically react with the polymer structure at some processing stage.

The ideal fire retardant additives should be inexpensive, colorless, easily incorporated into the polymer composition, compatible, stable to heat and light, efficient in its fire-retardant properties, nonmigrating, and have no adverse effects on the physical properties of the polymer. The toxicology of the additive is also of concern. Unfortunately, most presently available additives seldom meet all these requirements.

Additive flame-retardant systems are generally composed of both organic and inorganic materials acting to provide an optimum balance of flame retardance, physical properties and cost. Additive retardants are generally incorporated by compounding and are useful in a variety of polymer systems. These materials are generally used for thermoplastic resins, although there are exceptions. With few exceptions, additive resins are used to fire retard flexible polyurethane foams. Halogenated organic compounds, such as PVC, or decabromodiphenyl oxide (DBDPO) in combination with antimony oxide typifies this type of system. DBDPO has long been the standard of comparison in many rigid plastics. Other compounds of this type include polychlororene, chlorinated polyethylene, and chlorosulfonated polyethylene, chlorinated parraffins, tris(dichloropropyl)phosphate, methyl pentachlorostearate, and various chlorinated phosphates for polyurethane foams and topical fabric treatment; cycloaliphatic chlorine-containing flame retardants (with higher thermal stability) for thermoplastics like polypropylene and nylon; and chlorendic anhydride, which is used as an intermediate in making flame retardant polyesters and epoxy resins.

Reactive flame retardant systems contain functional groups allowing them to be incorporated directly into the polymer structure through chemical reactions. The main advantage of this type of fire retardant is the permanence of the fire retardancy imparted. In most cases, chemically reacting the fire retardant into the polymer essentially eliminates long-term migration of the fire retardant.

Reactive flame retardants are primarily used in unsaturated polyesters, epoxy resins and polyurethane foams. Two of the most popular reactive flame retardants are tetrabrombisphenol A and dibromomononeopentyl and tetrabromophthalic glycol. Other reactive flame retardants include chlorendic acid and chlorendic anhydride, tetrabromophthalic and tetrachlorophthalic anhydride, and diallyl chlorendate. Other reactive flame retardants vary significantly in functionality and can be useful in many polymer reactions and applications. Reactive polyols which contain halogen groups, phosphorus, or both are used for flame-retardant urethane foam applications. These materials can be used alone, or with other flame retardants.

It is known that certain types of resins exhibit fire retardant properties. For example, thermosetting polymers differ from thermoplastics in that they become chemically crosslinked during final molding and curing. For most practical purposes, they can no longer be melted, reshaped or dissolved. Thermosetting resins are produced in large volume and are extensively used in the construction, housing, and large applicance industries where they may contribute significantly to the fire load in any particular area or product. For this reason, their fire safety characteristics are important. Because of their crosslinked nature, thermosets generally do no soften or drip when exposed to a flame, as do many thermoplastic materials. Their flammability is a function of the thermal stability of the primary chemical bonds and the ease with which volatile gaseous products can be produced by pyrolytic processes to provide fuel for a self-sustaining fire. Many thermosets (e.g. the phenolic resins) provide very little flammable fuel when heated by an ignition source. They produce an insulating char that can only be oxidized at extremely high temperatures and/or high oxygen concentrations. Burning of such materials can be a slow process under many conditions, since the polymer substrate is protected by the surface char. Such resins are inherently fire-retardant and will pass many common laboratory tests without the need for a fire-retardant modification or additive. Their fire retardance is, however, a function of the mechancial ability of the insulating char and is limited by the resistance of elemental carbon to oxidation. Other thermosets (e.g. styrenated polyester resins) do not form chars and burn readily.

SUMMARY OF THE INVENTION

The present invention provides an article of manufacture comprising two or more layers, at least one of said layers is a fibrous layer comprised of a network of fibers composed of one or more polymeric materials in a matrix material, and bonded to at least one surface of said fibrous layer a fire resistant layer comprising a fire retardant agent selected from the group consisting of compounds which exhibit a "net endothermic effect" in a matrix comprised of one or more relatively high char yield resins. As used herein, a compound which exhibits a "net endothermic effect" is one which absorbs heat when exposed to fire or heat as measured by differential scanning calorimetry or in other words, the summation of all endothermic and exothermic effects generated during such exposure results in a net endothermic effect or heat absorption.

Several advantages flow from this invention. The composition of this invention exhibits improved resistance to ignition under the Torch Test, and low emmission of smoke and toxic gases under the Boeing BSS7238 Test and the Boeing BSS7239 Test, respectively, as compared to a composite of equal or substantially equal areal density formed from the fibers of the fibrous layer alone. At the same time, the composite of this invention exhibits ballistic properties which are at the same level or substantially at the same level of a fibrous layer composite of the same areal density. The composite of this invention preferably retains at least about 50% of its ballistic properties and at least about 50% of its mechanical properties after the Torch Test.

BRIEF DESCRIPTION OF THE DRAWINGS

The invention will be more fully understood and further advantages will become apparent when reference is made to the following detailed description of the invention and the accompanying drawings in which.

DETAILED DESCRIPTION OF THE INVENTION

The ballistic resistant article of this invention exhibits several beneficial properties. For example, the ballistic resistant article has reduced smoke production when evaluated in the smoke test of BSS7238 using an optical density, "$D_s$", measurement at 4.0 minutes which is generally equal to or less than about 500, preferably equal to or less than about 200, more preferably equal to or less than about 80 and most preferably equal to or less than about 50.

The ballistic performance of the article of this invention is not significantly impaired after subjection to heat and/or flame. The ballistic performance of the article during ballistic impact can be expressed in terms of specific energy absorption (SEA). The specific energy absorbed during a ballistic impact can be calculated based on the areal density (AD) using the following equation:

$$SEA(Jm^2/kg) = \frac{1}{2}[mv^2/AD]$$

where
m is mass of the projectile;
v is velocity of the projectile which is statistically at the borderline of complete penetration (i.e. the projectile velocity which has a 50% probability of penetrating the target);and
AD is the areal density of the ballistic resistant article, and is the weight of the article per unit area, kg/m².

The SEA of the ballistic resistant article of this invention prior to subjection to the Torch test (see the examples) is generally at least about 30% of the SEA of a ballistic amor of the same areal density consctruted form the fibrous layer. The SEA of the article of this invention is preferably about 75%, more preferably about 80%, and most preferably about 90% of the SEA of a ballistic armor of the same areal denisty constructed from the fibrous layer alone. In those embodiments of choice, the SEA is from about 95 to about 100% of the SEA of a ballistic armor of the same areal density constructed from the fibrous layer alone.

The article of this invention also retains significant portions of its ballistic resistance after subjection to the Torch Test. For example, after subjection to the Torch Test, the reduction in SEA is general not more than about 90%, preferably not more than about 50%, more preferably not more than about 30% and most preferably not more than about 10%, with those embodiments in which the reduction in SEA is not more than about 1% being the embodiments of choice.

The fibers in the fibrous layer of the ballistic resistant article of this invention also retain their tensile properties after subjection to the Torch Test as measured by ASTM D3039. For example, the fibers retain at least about 20%, preferably at least about 40%, more preferably at least about 60% and most preferably at least about 80% of their tensile properties, with those embodiments with at least about a 95% retention of tensile properties being the embodiments of choice.

Figure 1:
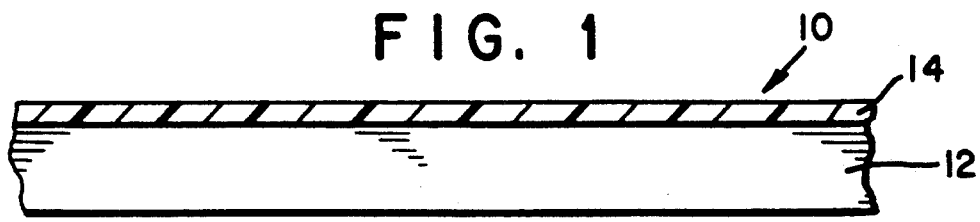
FIG. 1 is a fragmentary view in cross-section of a composite of this invention showing its essential elements of a fibrous layer and a fire retardant layer.
Figure 2:
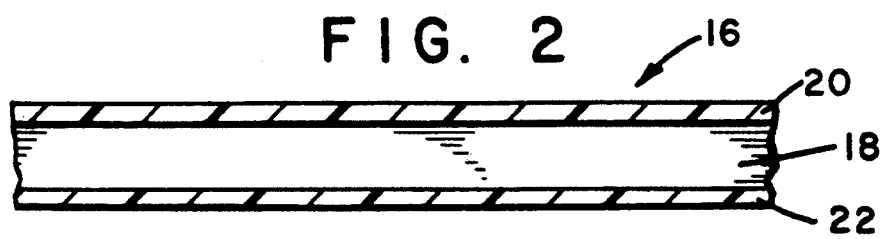
FIG. 2 is a fragmentary view in cross-section of a modified embodiment of this invention showing a fibrous layer having a fire retardant layer bonded to each of its parallel planar sufaces.

The present invention will be better understood by those of skill in the art by reference to the figures. Referring to FIGS. 1 and 2, the numeral 10 indicates a ballistic resistant article 10. In its broadest aspects, article 10 as depicted in FIG. 1 comprises at least two layers, one of which in fibrous layer 12 and the other of which is flame resistance layer 14.

The combined areal density of fibrous layer(s) 12 and flame resistant layer(s) 14 may vary widely. In general, the areal density is equal to or greater than about 1.0 Kg/m². In the preferred embodiments of the invention, the areal density is equal to or than about 2.0 Kg/m², and in the more greater than about 2.0 Kg/m², and in the more preferred embodiments of the invention, the areal density is from about 1 to about 100 Kg/m². In the most preferred embodiments of the invention, the areal density is from about 2 to about 100 Kg/m².

The volume percents of fibrous layer(s) 12 and flame resistant layer(s) 14 in article 10 may vary widely. In general, the volume percent of fibrous layer(s) 12 may vary from about 50 to about 99 volume percent, and the volume percent of flame resistant layer(s) 14 may vary from about 1 to about 50weight percent based on the total weight of article 10. In the preferred embodiments of the invention, the volume percent of fibrous layer(s) 12 may vary from about 85 to about 99 volume percent, and the volume percent of the flame resistant layers from about 1 to about 15 volume percent based on the total volume of article 10. In the more preferred embodiments of the invention, the volume percent of fibrous layer(s) 12 may vary from about 90 to about 96 volume percent and the volume percent of flame resistant layer(s) 14 may vary from about 4 to about 10 volume percent based on the total volume of article 10, and in the most preferred embodiments of the invention, the volume percent of fibrous layer(s) 12 may vary from about 93 to about 96 volume percent and the volume percent of flame resistant layer(s) 14 may vary from about 4 to about 7 weight percent on the aforementioned basis.

Fibrous layer 12 comprises a network of fibers in a matrix. For purposes of the present invention, fiber is defined as an elongated body, the length dimension of which is much greater than the dimensions of width and thickness. Accordingly, the term fiber as used herein includes a monofilament elongated body, a multifilament elongated body, a multifilament elongated body, a ribbon, a strip, a film and the like having regular or irregular cross sections. The term fibers includes a plurality of any one or combination of the above.

The cross-section of fibers for use in this invention may vary widely. Useful fibers may have a circular cross-section, a oblong cross-section or an irregular or regular multi-lobal cross-section having one or more regular or irregular lobes projecting from the linear or longitudinal axis of the fiber. In the particularly preferred embodiments of the invention, the fibers are of substantially circular or oblong cross-section and in the most preferred embodiments are of circular of substaintially circular cross-section.

In article 10 of this invention, the fibers may be arranged in networks having various configurations. For example, a plurality of fibers can be grouped together to form twisted or untwisted yarn or fiber bundles in various alignments. The fiber or yarn may be formed as a felt, knitted or woven (plain, basket, satin and crow feet weaves, etc.) into a network, fabricated into non-woven fabric, arranged in parallel array, layered, or formed into a woven fabric by any of a variety of conventional techniques. Among these techniques, for ballistic resistance applications we prefer to use those variations commonly employed in the preparation of aramid fabrics for ballistic-resistant articles. For example, the techniques described in U.S. Pat. No. 4,181,768 and in M. R. Silyquist et al., *J. Macromol Sci. Chem.*, A7(1), pp. 203 et. seq. (1973) are particularly suitable. In preferred embodiments of the invention, the fibers in each layer 12 are aligned in a substaintially parallel and unidirectional fashion, and the matrix material substantially coats the individual filaments. Such preferred fiber configurations are described in more detail in U.S. Pat. Nos. 4,623,574; 4,748,064; 4,916,000,; 4,403,012; 4,457,985; 4,650,710; 4,681,792; 4,737,401; 4,543,286; 4,563,392; and 4,501,856.

The type of fibers used in the fabrication fibrous layer 12 of the article of this invention may vary widely. Preferred fibers for use in the practice of this invention are those having a tenacity equal to or greater than about 7 g/d (as measured by an Instron Tensile Tester), tensile modulus equal to or greater than about 130 g/d (as measured by an Instron Tensile) and an energy-in-break equal to or greater than about 30 joules/gram. Particularly preferred fibers are those having a tenacity equal to or greater than about 20 g/d, a tensile modulus equal to or greater than about 500 g/d and energy-in-break equal to or greater than about 30 joules/grams. Amongst these particularly preferred embodiments, most preferred are those embodiments in which the tenacity of the fibers are equal to or greater than about 25 g/d, the tensile modulus is equal to or greater than about 1000 g/d, and the energy-to-break is equal to or greater than about 35 joules/grams. In the practice of this invention, fibers of choice have a tenacity equal to or greater than about 30 g/d, a tensile modulus equal to or greater than about 1300 g/d and an energy-to-break is equal to or greater than about 40 joules/grams.

The denier of the fiber may vary widely. In general, fiber denier is equal to or less than about 4000. In the preferred embodiments of the invention, fiber denier is from about 10 to about 4000, in the more preferred embodiments of the invention fiber denier is from about 50 to about 3500 and in the most preferred embodiments of the invention, fiber denier is from about 100 to about 3000.

Fibers for use in the practice of this invention may be inorganic fibers, organic fibers or a combination thereof. Useful inorganic fibers include S-glass fibers, E-glass fibers, boron fibers, $S_2$-glass fibers, alumina-silica fibers, zirconia-silica fibers, carbon fibers and the like. Illustrative of useful organic fibers are those composed of polyesters, polyolefins, polyetheramides, fluoropolymers, polyethers, celuloses, phenolics, polyesteramides, polyurethanes, epoxies, amimoplastics, silicones, polysulfones, polyetherketones, polyetheretherketones, polyurethanes, polyesterimides, polyphenylene sulfides, polyether acryl ketones, poly(amideimides), and polyimides. Illustrative of other useful organic filaments are those composed of aramids (aromatic polyamides), such as poly(m-xylylene adipamide), poly (p-xylylene sebacamide), (poly 2,2,2-trimethylhexamethylene terephthalamide), poly (hexamethylene terephthalamide), poly (metaphenylene isophthalamide) (Nomex ®) and poly (p-phenylene terephthalammide) (Kevlar ®); aliphatic and cycloaliphatic polyamides, such as a copolyamide of 30% hexamethylene diammonium isophthalate and 70% hexamethylene diammonium adipate, the copolyamide of up to 30% bis-(-amidocyclohexyl)methylene, terephthalic acid and caprolactam, polyhexamethylene adipamide (nylon 66), poly(butyrolactam) (nylon 4), poly (9-aminonoanoic acid) (nylon 9), poly(enantholactam) (nylon 7), poly(capryllactam) (nylon 8), polycaprolactam (nylon 6), poly (butamethylene adipamide)(nylon 4, 6), polyhexamethylene sebacamide (nylon 6, 10), polyaminoundecanamide (nylon 11), polydodecamide (nylon 12), polyhexamethylene isophthalamide, poly(nonamethylene azelamide) (nylon 9,9), poly(decamethylene azelamide) (nylon 10,9), poly(decamethylene sebacamide) (nylon 10,10), poly([bis-(4-aminocyclohexyl) methane 1,10-decanedicarboxamide] (Qiana) (trans), or combinations thereof; and aliphatic, cycloaliphatic and aromatic polyesters such as poly(1,4-cyclohexylidene dimethyl eneterephathalate) cis and trans, poly(ethylene-1, 5-naphthalate), poly(ethlene-2,6-naphthalate), poly(1,4-cyclohexane dimethylene terephthalate) (trans),poly(-decamethylene terephthalate), poly(ethylene terephthalate), poly(ethylene isophthalate), poly(ethylene oxybenozoate), poly(para-hydroxy benzoate), poly(-dimethylpropiolactone), poly (decamethylene adipate), poly(ethylene succinate), poly(ethylene azelate), poly(-decamethylene sebacate), poly(2,2-dimethylpropiolactone), and the like.

Also illustrative of useful organic fibers are those of liquid crystalline polymers such as lyotropic liquid crystalline polymers which include polypeptides such as poly-γ-benzyl L-glutamate and the like; aromatic polyamides such as poly (1,4-benzammide), poly(chloro-1,4-phenylene terephthalamide), poly(1,4-phenylene fumaramide), poly(chloro-1,4-phenylene fumaramide), poly(4,4'-benzanilide trans, trans-muconamide), poly(1,4-phenylene mesaconamide), poly(1,4-phenylene-trans-1,4-cyclohexylene amide), poly (chloro-1,4-phenylene-trans-1,4-cyclohexylene amide), poly(chloro-1,4-phenylene) (trans-1,4-cyclohexylene amide), poly(1,4-phenylene 1,4-dimethyl-trans-1,4-cyclohexylene amide), poly(1,4-phenylene 2,5-pyridine amide), poly(-chloro-1,4-phenylene 2,5-pyridine amide), poly (3,3'-dimethyl-4,4'- biphenylene 2,5 pyridine amide), poly (1,4-phenylene 4,4'-stilbene amide), poly(chloro-1.4-phenylene 4,4'-stilbene amide), poly 1,4-phenylene 4,4'-azobenzene amide), poly (4,4'-azobenzene 4,4'-azobenzene amide), poly(1,4-phenylene 4,4'-azoxybenzene amide), poly(4-4-azobenzene 4,4'-azoxybenzene amide), poly (1,4- cyclohexylene 4,4'-azabenzene amide), poly 4,4-phenanthridinone terephthal amide), poly(3,8-phenanthridinone terephthal amide), poly(4-4'-biphenylene terephthal amide), poly(4,4-bibenzo amide), poly(1,4-phenylene4,4'-bibenzo amide), poly (1,4-phenylene4,4'-terephenylene amide), poly(1,4-phenlene2,6-naphthal amide), poly(1,4-phenylene 4,4'-terephenylene amide), poly (1,4-phenylene2,6-naphthalamide), poly(1,5-naphthylene terephthal amide), poly (3,3'-dimethyl-4,4-biphenylene terephthal amide), poly(3,3'-dimethoxy-4,4'-biphenylene terephthal amide), poly(3,3'-dimethoxy-2,2-biphenylene 4,4-bibenzo amide) and the like; polyoxamides such as those derived from 2,2-dimethyl-4,4'diamino biphenyl and chloro-1,4-phenylene diamine; polyhydrazides such as poly( chloroterephthalic hydrazide), poly(2,5-pyridine dicarboxylic acid hydrazide) poly(terephthalic hydrazide), poly(terephthalic-chloroterephthalic hydrazide)· and the like; poly(amide-hydrazides) such as poly(terephthaloyl 1,4 amino-benzhydrazide) and those prepared from 4-amino-benzhydrazide, oxalic dihydrazide, terephthalic dihydrazide and para-aromatic diacid chlorides; polyesters such as poly(oxy-trans-1,4-cyclohexyleneoxycarbonyl-trans-1,4-cyclohexylenecarbonyl-β-oxy-1,4-phenyl-eneoxyterephtha loyl) and poly (oxycis-1,4-cyclohexyleneoxycarbonyl-trans-1,4-cyclohexylencar bonyl-β-oxy-1.4-phenyleneoxyterephthaloyl) in methylene chloride-o-cresol, poly [(oxy-trans-1,4-cyclohexyleneoxycarbonyl-trans-1,4-cyc lohexylenoxycarbonyl-trans-1,4-cyclohexylenecarbonyl-β-oxy (2-methyl-1,3-phenylene) oxyterephthaloyl] in o-chlorophenol and the like; polyazomethines such as those prepared from 4,4'-phenylendiamine and terephthalaldelyde and the like; polyisocyanides such as poly (γ-phenyl ethyl isocyanides) poly (n-octyl isocyanides), and the like; polyisocyanates such as poly(n-alkyl isocyanates) as for example poly(n-butyl isocyanate), poly(n-hexyl isocyanate) and the like; lyrotropic crystalline polymers with heterocylic units such as poly(1,4-phenylene-2,6-benzobisthiazole) (PBT), poly(1,4-phenylene-2,6-benzobisthiazole)(PBO), poly(1,4-phenylene-1,3,4-oxadiazole), poly(1,4-phenylene -2,6-benzobisimidazole), poly[2,5(6)-benzimidazole] (AB-PBI), poly-[2,6-(1,4-phenylene)-4-phenylquinoline], poly-[1,1'-(4,4-biphenylene)-6,6'bis(4-phenylquinoline)] and the like; polyorganophosphazines such as polyphosphazine, polybisphenoxyphosphazine, poly[bis(2,2,2'-tirifluoroethyelene) phosphazine] and the like; metal polymers such as those derived by condensation of trans-bis-(tri-n-butylphosphine) platinum dichloride with a bisacetylene or trans-bis-(tri-n-butylphoshine)bis(1,4-butadinynyl) platinum and similar combinations in the presence of suprous iodine and an amide; cellulose and cellulose derivatives such as esters of cellulose as for example triacetate cellulose, acetate cellulose, acetatebutyrate cellulose, nitrate cellulose, and sulfate cellulose, ethers of cellulose as for example, ethyl ether cellulose, hydroxymethyl ether cellulose, hydroxypropyl ether cellulose, hydroxymethyl ether cellulose, hydroxpropyl ether cellulose, carboxymethyl ether cellulose, ethyl hydroxyethyl ether cellulose, cyanoethylethyl ether cellulose, ether-esters of cellulose as for example acetoxyethyl ether cellulose and benzoyloxpropyl ether cellulose; and thermotropic liquid crystalline polymers such as celuloses and their derivations as for example hydyroxpropyl cellulose, ethyl cellulose propionoxpropyl cellulose, thermotropic liquid crystalline polymers such as celluloses and their derivatives as for example hydroxy propyl cellulose and propionoxy-propyl allulose, thermotropic copolyesters as for example copolymers of 6-hydroxy-2-naphthoic acid and p-hydroxy benzoic acid, copolymers of 6-hydroxy-2-naphthoic acid, terephthalic acid and p-amino phenol, copolymers of 6-hydroxy-2-naphthoic acid, terephthalic acid and hydroquinone, copolymers of 6-hydroxy-2-naphthoic acid, p-hydroxy benzoic acid, hydroquinone and terephthalic acid, copolymers of 2,6-napthalene dicarboxylic acid, terephthalic acid, isophthalic acid and hydroquinone, copolymers of 2,6-naphthalene dicarboxylic acid and terephthalic acid, copolymers of p-hydroxybenzoic acid, terephthalic acid, 4,4'-dihydroxydiphenyl, copolymers of p-hydroxybenzoic acid, terephthalic acid, isophthalic acid and 4,4'-dihydroxydiphenyl, p-hydroxybenzoic acid, isophthalic acid, hydroquinone and 4,4'-dihydroxbenzophenone, copolymers of phenylterephthalic acid and hydroquinone, copolymers of chlorohydroquinone, terephthalic acid and ethylene dioxy-4,4'-dibenzoic acid, copolymers of hydroquinone, methylhydroquinone, p-hydroxybenzoic acid and isophthalic acid, copolymers of (1-phenylethyl) hydroquinone, terephthalic acid and hydroquinone, and copolymers of poly(ethylene terephthalate) and p-hydroxybenzoic acid; thermotropic polyamides; and thermotropic copoly (amide-esters).

Also illustrative of useful organic fibers for use in the fabrication of fibrous layer 12 are those composed of extended chain polymers formed by polymerization of α,β-unsaturated monomers of the formula:

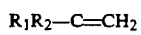

wherein:

$R_1$ and $R_2$ are the same or different and are hydrogen, hydroxy, halogen, alkylcarbonyl, carboxy, alkoxycarbonyl, heterocycle or alkyl or aryl either unsubstituted or substituted with one or more substituents selected from the group consisting of alkoxy, cyano, hydroxy, alkyl and aryl. Illustrative of such polymers of α,β-unsaturated monomers are polymers including polystyrene, polyethylene, polypropylene, poly(1-octadecene), polyisobutylene, poly(1-pentene), poly(2-methylstyrene), poly(4-methylstyrene), poly(1-hexene), poly(1-pentene), poly(4-methylpentene), poly (1-butene), polyvinyl chloride, polybutylene, polyacrylonitrile, poly(methyl pentene-1), poly(vinyl alcohol), poly(vinyl-acetate), poly(vinyl butyral), poly(vinyl chloride), poly(vinylidene chloride), vinyl chloride-vinyl acetate chloride copolymer, poly(vinylidene fluoride), poly(methyl acrylate, poly(methyl methacrylate), poly(methacrylonitrile), poly (acrylamide), poly(vinyl fluoride), poly(vinyl formal), poly(3-methyl-1-butene), poly(1-pentene), poly(4-methyl-1-butene), poly(1-pentene), pol(4-methyl-1-pentence, poly(1-hexane), poly(5-methyl-1-hexene), poly(1-octadecene), poly(vinyl-cyclopentane), poly(vinylcyclothexane), poly(viny-ethylether), poly(vinyl methyl ether), poly(vinyl-ethylether), poly(vinyl propylether), poly(vinyl carbazole), poly(vinyl prolidone), poly(2-chlorostyrene), poly(4-chlorostyrene), poly(vinyl formate), poly(vinyl butyl ether), poly(vinyl octyl ether), poly(vinyl methyl ketone), poly(methylisopropenyl ketone), poly(4-phenylstyrene) and the like.

In the most preferred embodiments of this invention, the fibers forming fibrous layer(s) 12 are "flammable fibers". As used herein, "flammable fibers" are those which are ignitable when subject to flame in the Torch Test described in the Examples and/or which produce smoke and/or toxic gases when subject to heat or flame such that the concentration of the gases carbon monoxide (CO), nitrogen dioxide ($NO_2$), sulfur dioxide ($SO_2$), hydrogen chloride (HCl), hydrogen fluoride (HF) and/or hydrogen cyanide (HCN) exceed the limits of BSS7239 and/or smoke reduction is greater than 500 when evaluated in the smoke test of BSS 7238 using an optical density "Ds" of 4.0 minutes.

Flammable fibers are preferred for use in the practice of this invention because they may best utilize the benefits of flame resistance layer(s) 14. Preferred flammable fibers include high molecular weight polyethylene fibers, high molecular weight polyethylene fibers, high molecular weight polypropylene fibers, a high molecular weight polyvinyl alcohol fibers, a high molecular weight polyacrylonitrile fibers or mixtures thereof. U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene fibers preferred fibers are those of molecular weight of at least 150,000, preferably at least one million and more preferably between two million and five million. Such extended chain polyethylene (ECPE) fibers may be grown in solution as described in U.S. Pat. No. 4,137,394 or U.S. Pat. No. 4,356,138 or a fiber spun from a solution to form a gel structure, as described in German Off. 3,004,699 and GB 2051667, and especially described in U.S. Pat. No. 4,551,296 (see EPA 64,167, published Nov. 10, predominantly linear polyethylene material that may contain minor amounts of chain branching or comonomers not exceeding 5 modifying units per 100 main chain carbon atoms, and that may also contain admixed therewith not more than about 50 wt % of one of more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated by reference. Depending upon the formation technique, the draw ratio and temperatures, and other conditions, a variety of properties can be imparted to these fibers. The tenacity of the fibers should be at least 15 grams/denier, preferably at least about about 25 grams/denier and most preferably at least about 30 grams/denier. Similarly, the tensile modulus of the filaments, as measured by an Instron tensile testing machine, is at least about 300 grams/denier, preferably at least about 500 grams/denier and more preferably at least 1,000 grams/denier and most preferably at least about 1,200 grams/denier. These highest values for tensile modulus and tenacity are generally obtainable only by employing solution grown or gel fibers processes.

Similarly, high oriented polypropylene of molecular weight at least about 200,000 preferably at least about one million and more preferably at least about two million may be used. Such high molecular weight polypropylene may be formed into reasonably well oriented fibers by the techniques prescribed in the various references referred to above, and especially by the technique of U.S. Pat. No. 4,551,296. Since polypropylene is a much less crystalline material than polyethylene and contains pendant methyl groups, tenacity values achievable with polypropylene are generally substantially lower than the corresponding values for polyethylene. Accordingly, a suitable tenacity is at least about 8 grams/denier, with a preferred tenacity being at least about 11 grams/denier. The tensile modulus for polypropylene is at least about 160 grams/denier, preferably at least about 200 grams/denier. The particularly preferred ranges for the above-described parameters can advantageously provide improved performance in the final article.

High molecular weight polyvinyl alcohol fibers having high tensile modulus are described in U.S. Pat. No. 4,440,711 which is hereby incorporated by reference to the extent it is not inconsistent herewith. In the case of polyvinyl alcohol (PV-OH), PV-OH fiber of molecular weight of at least about 200,000. Particularly useful Pv-OH fiber should have a modulus of at least about 300 g/d, a tenacity of at least about 7 g/d (preferably at least about 10 g/d, more preferably at about 14 g/d, and most preferably at least about 14 g/d, and most preferably at least about 17 g/d), and an energy-to-break of at least about 8 joules/gram are more useful in producing a ballistic resistant article. PV-OH fibers having such properties can be produced, for example, by the process disclosed in U.S. Pat. No. 4,599,267.

In the case of polyacrylonitrile (PAN), PAN fibers of molecular weight of at least about 400,000. Particularly useful PAN fiber should have a tenacity of at least about 10 g/d and an energy-to-break of at least about 15 to about 20 g/d and an energy-to-break of at least about 8 joules/gram is most useful in producing ballistic resistant articles. Such fibers are disclosed, for example, in U.S. Pat. No. 4,535,027.

The fibers are dispersed in a continuous phase of a matrix material which preferably substantially coats each fiber contained in the bundle of filament. The manner in which the fibers are dispersed may vary widely. The fibers may be aligned in a substantially parallel, unidirectional fashion, or fibers may be aligned in a multidirectional fashion with fibers at varying angles with each other. In the preferred embodiments of this invention, fibers in each layer 12 are aligned in a substantially parallel, unidirectional fashion such as in a prepreg, pultruded sheet and the like.

The matrix material employed in the practice of this invention comprises one or more "thermosetting resins", one or more "thermoplastic resins", or a combination thereof which preferably result in relatively high char yield (preferably equal to or greater than about 20% by weight, more preferably from about 25 to about 80% by weight and most preferably from about 50 to about 70% by weight based on the total initial weight of the resin, when a 15mg sample is heated at a rate of 20° C./min in an Argon atmosphere from about room temperature (20° to 30° C.) to about 1000° C. in a thermal gravimetric analyzer (TGA). As used herein "thermoplastic resins" are resins which can be heated and softened, cooled and hardened limitless time without undergoing a basic alteration, and "thermosetting resins" are resins which do not tolerate thermal cycling and which cannot be resoftened and reworked after molding, extruding or casting and which attain new, irreversible properties when one set at a temperature which is critical to each resin.

The choice of any thermosetting resin, thermoplastic resin or combination for use in the formation of the matrix may vary widely depending on the desired characteristics of the composite. One important characteristic of the matrix material is its modulus which is preferably equal to or greater than about 500 psi (3,450 kPa). The upper limit for the modulus is not critical and usually the higher the modulus the more desirable are composite properties. In the preferred embodiments of the invention, the matrix material is selected such that the matrix material has a modulus equal to or greater than about 500 psi (3,450 kPa), and in the particularly preferred embodiments, these resins are selected such that the matrix material has a modulus equal to or greater than about 2,000 psi (13, kPa). In the most preferred embodiments of the invention, the thermoplastic and thermosetting resins are selected such that the matrix material has a modulus equal to or greater than about 5,000 psi (34,5000 kPa).

Thermosetting resins useful in the practice of this invention may vary widely. Illustrative of useful thermosetting resins are alkyds such as those derived from esterification of polybasic acids, as for example, phthalic anhydride, fumaric acid, maleic anhydride, isophthalic acid, terephthalic acid, trimesic acid, hemimellitic acid, succinic anyhydride, fatty acids derived from mineral or vegetable oils and the like, and polyhydric alcohols as for example glycerol, ethylene glycol, propylene glycol, pinacol 1,4-butanediol, 1,3- propandediol, sorbitol, pentaerythritol, 1,2-cyclohexanediol and the like. Other useful thermosetting resins are acrylics such as crosslinkable polyacrylics, polyacrylates, epoxdiacrylates, urethane diacrylates and the like. Still other useful thermosetting resins are amino resins derived from reaction between formaldehyde and various amino compounds such as melamine, urea, aniline, ethylene urea, sulfonamide, dicyanodiamide and the like. Other useful thermosetting resins include urethanes derived from reaction between formaldehyde and various amino compounds such as melamine, urea, aniline, ethylene urea, sulfonamide, dicyanodiamide and the like. Still no other useful thermosetting resins include urethanes derived from reaction of polyisocyanates or diisocyanates such as 2,6-tolylene diisocyanate, 2,4-tolylene diisocyanate, 4,4'-diphenyl-methane diisocyanate, 4,4'-dicyclohexyl-methane diisocyanate, 4,4'-dicyclohexyl-methane diisocyanate and the like, and polyols such as glycerin, ethylene glycol, diethylene glycol, trimethylolpropane, 1,2,6-hexanetriol, sorbitol, pentaerythritol and the like.

Exemplary of still other thermosetting resins useful in the practice of this invention are unsaturated polyesters derived from reaction of dibasic acids such as maleic anhydride, fumaric acid, adipic acid, azelaic acid and the like, and dihydric alcohols such as ethylene glycol and propylene glycol, 1,3-butylene glycol, 2,3-butylene glycol, diethylene glycol, dipropylene glycols and the like; and silicones such as dimethyldichlorosilane and the like;

Yet another class of useful thermosetting resins are epoxies based on saturated or unsaturated aliphatic, cycloaliphatic, aromatic and heterocyclic epoxides. Useful epoxies include glycidyl ethers derived from epichlorohydrin adducts and polyols, particularly polyhydric phenols. Another useful epoxide is the diglycidyl ether of bisphenol A. Additional examples of useful polyepoxides are resorcinol diglycidyl ether, 3,4-epoxy-6-methylcyclohexylmethyl-9,10-epoxystearate, 1,2-bis(2,3-epoxy-2-methylpropoxy) ethane, diglycidyl ether of 2,2-(p-hydroxyphenyl) propane, butadine dioxide, dicyclopentadiene dioxide, pentaerythritol tetrakis(3,4- epoxycyclohexanecarboxylate), vinylcyclohexene dioxide, divinylbenzene dioxide, 1,5-pentadiol bis(3,4-epoxycyclo-hexane carboxylate), ethylene glycol bis(3,4-epoxycyclo-hexane carboxylate), Z,2-diethyl-1,1,3-propanediol bis(3,4-epoxycyclohexanecarboxylate), 1,6-hexanediol bis(3,4-epoxycyclohexanecarboxylate), 2-butene-1,4-diol trimethylolpropane tris (3,4-expoxy-6-methylcyclohexanecarboxylate), 1,1,1-trimethylolpropane tris (3,4-expoxycyclohexanecarboxylate), 1,2,3-propanetriol tris(3,4-epoxycyclohexanecarboxylate), dipropylene glycol bis(2-ethylhexyl-4,5-epoxycyclohexane-1,2-dicarboxylate), diethylene glycol bis(3,4-epoxy-6-methylcyclohexanecarboxylate), triethylene qlycol bis(3,4-epoxycylohexanecarboxylate), 3,4-epoxycyclohexyl-methyl 3,4-epoxycyclohexanecarboxylate, 3,4-epoxy-1-methylcyclohexylmethyl 3,4-epoxy-1-methylcyclohexane-carboxylate, bis(3,4-epoxycyclohexylmethyl) pimelate, bis(3,4-epoxy-6-methylenecyclohexylmethyl) maleate, bis(3,4-epoxy-6-methylcyclohexylmethyl) succinate, methylcyclohexylmethyl) sebacate, bis(3,4-epoxy-6-methylcyclohexylmethyl) adipate, bis(3,4-epoxycyclohexylmethyl) terephthalate, 2,2'-sulfonyldiethanol bis(3,4-epoxycyclohexanecarboxylate), N,N'-ethylene bis(4,5-epoxycyclohexane-1,2-dicarboximide), di(3,4-epoxycyclohexylmethyl) 1,3-tolylenedicarbamate, 3,4-epoxy-6-methylcyclohexanecarboxaldehyde acetal, 3,9-bis(3,4-epoxycylohexyl) spirobi-(methadioxane), and the like.

Useful thermosetting resins also include phenolic resins produced by the reaction of phenols and aldehydes. Useful phenols include phenol, o-cresol, m-cresol, p-cresol, p-tertbutylphenol, p-tertoctylphenol, p-nonylphenol, 2,3-xylenol, 2,4-xylenol, 2,5-xylenol, 2,6-xylenol, 3,1-xylenol, 3,4-xylenol, resorcinol, bispenol-A and the like. Useful aldehydes include formaldehyde, acetaldehyde, propionaldehyde, n-butyraldehyde, isobutyraldehyde, glyoxal, furfural and the like.

Other useful thermosetting resins are vinylesters such as the condensation product of epoxide resins and unsaturated acids usually diluted in a compound having double bond unsaturation such as vinylaromatic monomer as for example styrene and vinyltoluene, and diallyl phthalate. Illustratrive of useful vinylesters are diglycidyl adipate, diglycidyl isophalate, di-(2.3-epoxybutyl) adipate, di-(2,3-epoxybutyl) oxalate, di-(2,3-epoxyhexyl) succinate, di-(3,4-epoxybutyl) maleate, di-(2,3-epoxyhexyl) succinate, di-(3,4-epoxybutyl) maleate, di-(2,3-epoxyoctyl) pimelate, di-(2,3-epoxybutyl) phthalate, di-(2,3-epoxyoctyl) tetrahydrophthalate, di-(4,5-epoxy-dodecyl) maleate, di-(2,3-epoxybutyl) terephthalate, di-(2,3-epoxypentyl) thiodipropionate, di-(5.6-epoxy-dodecyl)maleate, di-(2,3-epoxybutyl) terephthalate, di-(2.3-epoxyoctyl) tetrahydrophthalate, di-(4,5-epoxy-dodecyl) maleate, di-(2,3-epoxybutyl) terephthalate, di-(2,3-epoxypentyl) thiodipropionate, di-5,6-epoxy-tetradecyl) diphenyldicarboxylate, di-(3,4-epoxyheptyl) sulphonyldibutyrate, tri-(2,3-epoxybutyl) 1,2,4 butanetricarboxylate, di-(5,6-epoxypentadecyl) maleate, di-(2,3-epoxybutyl) azelate, di(3,4-epoxypentadecyl) citrate, di-(5,6-epoxyoctyl) cyclohexane-1,3-dicarboxylate, di-(4,5-epoxyoctadecyl) malonate, bisphenol-A-fumaric acid polyester and the like.

Preferred thermosetting resins for use in the practice of this invention are vinyl esters, unsaturated polyesters, epoxies, phenolics, and mixtures thereof. Particularly preferred thermosetting resins are vinyl esters, epoxies and phenolics, with vinylesters being the thermosetting resin of choice.

Thermoplastic resins for use in the practice of this invention may also vary widely and may include these mentioned hereinabove for use in the formation of fibrous layer 12. Illustrative of useful thermoplastic resins are polylactones such as poly(pivalolactone), poly (caprolactone) and the like; polyurethanes derived from reaction of diisocyanates such as 1,5-naphalene diisocyanate, p-phenylene diisocyanate, m-phenylene diisocyanate, 2,4-toluene diisocyanate, 4,4'-diphenylmethane diisocyanate, 3',3-dimethyl-4,4'diphenylmethane diisocyanate, 3,3'dimethyl-4,4'biphenyl diisocyanate, 4,4'diphenylisopropylidene diisocyanate, 3,3'-dimethyl-4,4'diphenyl diisocyanate, 3,3'-dimethyl-4,4'-diphenylmethane diisocyanate, dianisidine diisocyanate, tolidine diisocyanate, hexamethylene diisocyanate, 4,4'-diisocyanadodiphenylmethane and the like and linear long-chain diols such as poly(tetramethylene adipate), poly(ethylene adipate), poly(1,4-butylene adipate), poly(1,5-pentylene adipate), poly(1,3-butylene adipate), poly(ethylene adipate), poly(1,4-butylene adipate), poly(1.5-pentylene adipate), poly(1,3-butylene adipate), poly(ethylene succinate), poly(2,3-butylene succinate), polyether diols and the like; polycarbonates such as poly[methane bis-(4-phenyl) carbonate], poly[1,1-ether bis(4-phenyl) carbonatel], poly[1,1-cyclohexane bis(4-phenyl) carbonatel] and the like; polysulfones; polyether ether ketones; polyamides such as poly(4-amino butyric acid), poly(hexamethylene adipamide), poly(6-,aminohexanoic acid), poly(m-xylylene adipamide), poly(p-xylylene sebacamide), poly(2,2,2-trimethyl hexamethylene terephthalamide), poly(metaphenyleneisophthalamide) (Nomex ®), poly(p-phenylene terephthalamide) (Kevlar ®), and the like; polyesters such as poly(ethylene azelate), poly(ethylene-1,5-naphthalate), poly(1,4-cyclohexane dimethylene terephthalate), poly(ethylene oxybenzoate) (A-Tell), poly(-para-hydroxy benzoate) (Ekonol), poly(1,4-cyclohexylidene dimethylene terephthalate) (Kodel) (as), poly(1,4-cyclohexylidene dimethylene terephthalate) (Kodel)(trans), polyethylene terephthalate, polybutylene terephthalate and the like; poly(arylene oxides) such as poly(2,6-diphenyl-1,4-phenylene oxide) and the like; poly(arylene sulfides) such as poly(phenylene sulfide) and the like; polyetherimides; thermoplastic elastomers such as polyurethane elastomers, fluoroelastomers, butadine/acrylonitrile elastomers, silicone elastomers, terpolybutadiene, polyisobutylene, ethylene-propylene copolymers, ethylene-propylene-diene terpolymers, polychloroprene, polysulfide elastomers, block copolymers, made of segments of glassy or crystalline blocks such as polystyrene, poly(vinyl-toluene), and poly(t-butyl styrene) and elastomeric blocks such as polybutadiene, polyisoprene, ethylene-propylene copolymers, and ethylene-propylene copolymers, ethylene-butylene copolymers, polyether ester and the like as for example the polystyrenepolybutadiene-polystyrene block copolymer manufactured by Shell Chemical Company under the trade name of Kraton ®; vinyl polymers and their copolymers such as polyvinyl acetate, polyvinyl alcohol, polyvinyl chloride, polyvinyl butyral, polyvinylidene chloride, ethylene-vinyl acetate copolymers, and the like; polyacrylics, polyacrylate and their copolymers such as poly(ethylacrylate), poly(n-butyl acrylate), poly(methyl methacrylate), poly(ethyl methacrylate), poly(n-butyl methacrylate), poly(n-propyl methacrylate), poly(acrylamide), poly(acrylonitrile), poly(acrylic acid), ethylene acrylic acid copolymers, methyl methacrylate styrene copolymers, ethylene ethyl acrylate copolymers, methacrylated butadiene styrene copolymers and the like; polyolefins such as low density polyethylene, polypropylene, chlorinated low density polyethylene, poly(4-methyl-1-pentene) and the like; ionomers; and poly(epichlorohydrins).

In the preferred embodiments of the invention, the thermoplastic material is selected from the group consisting of polyurethanes, polyvinyls, butadiene/olefin copolymers such as polystyrene-polyisoprene-polystyrene block copolymer thermoplastic elastomers, polyacrylics and polyolefins. In the particularly preferred embodiments of the invention the preferred thermoplastic material is a polyurethane, or a butadienes/olefin copolymer.

The proportion of matrix to fiber in fibrous layer(s) 12 is not critical and may vary widely depending on a number of factors including, whether the matrix material has any ballistic-resistant properties of its own (which is generally not the case) and upon the rigidity, shape, heat resistance, wear resistance, flammability resistance, mold cycle time, handling characteristics and other properties desired for the composite article. In general, the proportion of matrix to fiber in the composite may vary from relatively small amounts where the amount of matrix is about 10% by volume of the fibers to relatively large amounts where the amount of matrix is up to about 90% by volume of the fibers. In the preferred embodiments of this invention, matrix amounts of from about 15 to about 85% by volume are employed. All volume percents are based on the total volume of the composite. In the particularly preferred embodiments of the invention, ballistic-resistant articles of the present invention contain a relatively minor proportion of the matrix (e.g., about 10 to about 30% by volume of composite), since the ballistic-resistant properties are almost entirely attributable to the fiber, and in the particularly preferred embodiments of the invention, the proportion of the matrix in the composite is from about 10 to about 30% by volume of filaments.

Fibrous layer 12 of article 10 of this invention can be fabricated using a number of procedures. In general, layers 12 are formed by molding the combination of the matrix material and fibers in the desired configurations and amounts by subjecting the combination to heat, and pressure during a mold cycle time. An advantage of those embodiments of this invention in which the thermosetting resin is a vinyl ester is that relative short mold cycle times and temperatures may be employed.

The fibers may be premolded by subjecting them to heat and pressure. For example, for extended chain polyethylene fibers, molding temperatures range from abut 20° to about 150° C., preferably from about 80° to about 145° C., more preferably from about 100° to about 135° C. depending on the type of matrix material selected. The molding pressure may range from about 0 psi (0 kPa) to about 10,000 Psi (69,000 kPa). A pressure between about 10 psi (69 kPa) and about 100 Psi (690 kPa), when combined with temperatures below about 100° C. for a period of time less than about 1.0 min., may be used simply to cause adjacent fibers to stick together. Pressures from about 100 psi to about 10,000 psi (69,000 kPa), when coupled with temperatures in the range of about 100° to about 155° C. for a time of between about 1 to about 5 min.,may cause the fibers to deform and to compress together (generally in a film-like shape). Pressures from about 100 psi (690 kPa) to about 10,000 psi (69,000 kPa), when coupled with temperatures in the range of about 150° to about 155° C. for a time of between 1 to about 5 min., may cause the film to become translucent or transparent. For polypropylene fibers, the upper limitation of the temperature range would be about 10° to about 20° C. higher than for ECPE filament.

In the preferred embodiments of the invention, the fibers (premolded if desired) are precoated with the desired matrix material prior to being arranged in a network and molded as described above. The coating may be applied to the fibers in a variety of ways and any method known to those of skill in the art for coating filaments may be used. For example, one method is to apply the matrix material to the stretched high modulus fibers either as a liquid, a sticky soild or particles in suspension, or as a fluidized bed. Alternately, the matrix material may be applied as a solution or emulsion in a suitable solvent which does not adversely affect the properties of the fiber at the temperature of application. In these illustrative embodiments, any liquid capable of dissolving or dispersing the matrix material may be used. However, in the preferred embodiments of the invention useful solvents include water, paraffin oils, ketones, alcohols, aromatic solvents or hydrocarbon solvents or mixtures thereof, with illustrative specific solvents including paraffin oil, xylene, toluene and octane. The techniques used to dissolve or disperse the matrix in the solvents will be those conventionally used for the coating of thermoplastic resins on a variety of substrates.

Other techniques for applying the coating to the fibers may be used, including coating of the high modulus precursor (gel fiber) before the high temperature stretching operation, either before or after removal of the solvent from the fiber. The fiber may then be stretched at elevated temperatures to produce the coated filaments. The gel fiber may be passed through a solution of the appropriate matrix material, as for example an elastomeric material dissolved in paraffin oil, or an aromatic or aliphatic solvent, under conditions to attain the desired coating. Crystallization of the polymer in the gel fiber may or may not have taken place before the fiber passes into the cooling solution. Alternately, the fiber may be extruded into a fluidized bed of the appropriate matrix material in powder form.

The proportion of coating on the coated fibers or fabrics may vary from relatively small amounts (e.g., 1% by weight of fibers) to relatively large amounts (e.g., 150% by weight of fibers), depending upon whether the coating material has any impact or ballistic-resistant properties of its own (which is generally not the case) and upon the rigidity, shape, heat resistance, wear resistance, flammability resistance and other properties desired for the complex composite article. In general, ballistic-resistant articles of the present invention containing coated fibers should have a relatively minor proportion of coating (e.g., about 10 to about 30 percent by volume of fibers), since the ballistic-resistant properties are almost entirely attributable to the fiber. Nevertheless, coated fibers with higher coating contents may be employed. Generally, however, when the coating constitutes greater than about 60% (by volume of fiber), the coated fiber is consolidated with similar coated fibers to form a simple composite.

Furthermore, if the fiber achieves its final properties only after a stretching operation or other manipulative process, e.g. solvent exchanging, drying or the like, it is contemplated that the coating may be applied to a precursor material of the final fiber. In such case, the desired and preferred tenacity, modulus and other properties of the fiber should be judged by continuing the manipulative process on the fiber precursor in a manner corresponding to that employed on the coated fiber precursor. Thus, for example, if the coating is applied to the xerogel fiber described in U.S. Pat. No. 4,551,296, and the coated xerogel fiber is then stretched under defined temperature and stretch ration conditions, then the fiber tenacity and fiber modulus values would be measured on uncoated xerogel fiber which is similarly stretched.

It is a preferred aspect of the invention that each fiber be substantially coated with the matrix material for the production of composites having improved impact protection, delamination resistance, rigidity and/or ballistic resistance, and relatively shorter mold cycle times, preferably of less than about 30 minutes. Fibers are substantially coated by using any of the coating processes described above or can be substantially coated by employing and other process capable or producing fiber coated essentially to the same degree as a filament coated by the processes described heretofore techniques (e.g., by employing known high pressure molding.)

The fibers and networks produced therefrom are formed into "simple composites" as the precursor to preparing the complex composite articles of the present invention. The term, "simple composite", as used herein is intended to mean fibrous layer 12 made up of one layer of fibers as described above with a single major matrix material, which material may include minor proportions of other materials such as fillers, lubricants or the like.

The proportion of matrix material to fiber is variable for the simple composites, with matrix material amounts of from about 5% to about 150 vol %, by volume of the composite, representing the broad general range. Within this range, it is preferred to use composites having a relatively high fiber content, such as composites having only about 10 to about 30 vol % matrix material by volume of the composite.

Stated another way, the fiber network occupies different proportions of the total volume of the simple composite. Preferably, however, the fiber network comprises at least about 30 volume percent of the simple composite. For ballistic protecting, the fiber network comprises at least about 50 volume percent, more preferably about 70 volume percent, and most preferably at least about 75 volume percent, with the matrix occupying the remaining volume.

A particularly effective technique for preparing a preferred simple, composite comprised of substantially parallel, undirectional, aligned fibers includes the steps of pulling a fiber or bundles of fibers through a bath containing a solution of a matrix material and circumferentially winding this fiber into a single sheet-like layer around a bundle of fibers the length of a suitable form, such as a cylinder. The solvent, if used, is then evaporated leaving a sheet-like layer of fibers embedded in a matrix that can be removed from the cylindrical form. Alternatively, a plurality of fibers or bundles of fibers can be simultaneously pulled through the bath containing a solution or dispersion of a matrix material and laid down in closely positioned, substantially parallel relaion to one another on a suitable surface. Evaporation of the solvent leaves a sheet-like layer comprised of unidirectional fibers which are coated with the matrix material and which are substantially parallel and aligned along a common fiber direction. The sheet is suitable for subsequent processing such as laminating to another sheet to form fibrous layer 12 containing more than one layer of fibers.

Similarly, a fiber-type simple composite can be produced by pulling a group of fiber bundles through a dispersion or solution of the matrix material to substantially coat each of the individual fibers, and then evaporating the solvent to from the coated fiber. The fiber can then, for example, be employed to form fabrics, which in turn, can be used to form more complex composite structures. Moreover, the coated fiber can also be processed into a simple composite by employing conventional fiber winding techniques; for example, the simple compsite can have coated yarn formed into overlapping fiber layers.

The number of layers of simple composite included in fibrous layers 12 may vary widely depending on the use of article 10. For example, in those uses where article 10 would be used as ballistic protection, the number of layers would depend on a number of factors including the degree of ballistic protection desired and other factors known to those of skill in the ballistic protection art. In general for this application, the greater the degree of protection desired the greater the number of simple composite included in fibrous layer 12 for a given weight of layer 12. Conversely, the lessor the degree of ballistic protection required, the lessor the number of simple composite layers required for a given weight of layer 12. It is convenient to characterize the geometries of layer 12 by the geometries of the fibers and then to indicate that the matrix material may occupy part or all of the void space left by the network of fibers. One such suitable arrangement is a plurality of simple composite layers in which the coated fibers are arranged in a sheet-like array and aligned parallel to one another along a common fiber direction. Successive simple composite layers of such coated, uni-directional fibers can be rotated with respect to the previous layer to form a laminated fibrous layer 12. An example of such laminated fibrous layer 12 are those with the second, third, fourth and fifth layers rotated +45°, −45°, 90° and 0°, with respect to the first layer, but not necessarily in that order, Other examples include laminated fibrous layer 12 with 0°/90° layout of yarn of fibers. Procedures and materials for the fabrication of such preferred fibrous layers 12 are described in detail in U.S. Pat. Nos. 4,457,985; 4,613,535; 4,748,064; 4,916,000; 4,403,012; 4,623,574; and 4,737,402, which are incorporated herein by reference.

The article 10 of this invention includes one or more fire retardant layer(s) 12 bonded to a surface of one or more of fibrous layers 14. As used herein a "fire retardant layer" is a continuous or discontinuous layer comprised of a fire retardant composition comprising one or more inorganic or organic fire retardant agents which exhibit an endothermic effect on heating in a matrix material comprising one or more high char yield resins.

The fire retardant composition of this invention exhibits several unique properties. For example, the composition is "nonflammable". As used herein, "inflammable" means that the composition is not ignited when subjected to the Torch test. Another advantage of the composition of this invention is that it generates reduced levels of smoke and toxic gases when subjected to heat in the procedures of Boeing Specifications 7238 and 7239. In general, the concentration levels of toxic gases, carbon monoxide (CO), nitrogren dioxide ($NO_2$), sulfur dioxide ($SO_2$), hydrogen chloride (HCl), hydrogen fluoride (HF) and hydrogen cyanide (HCN) are less than the maximium specified in BSS 7239. The NBS smoke density measurements using the definition of smoke in the test of BSS 7238 and measuring optical density, $D_s$, at 4 minutes is such that Ds is equal to or less than about 500, preferably equal to or less than about 200 more preferably equal to or less than about 80 and most preferably equal to or less than about 50.

The composition also exhibits reduced thermal conductivity as measured by the procedure of Y. P. Khanna, et al, Polymer Engineering and Science, vol. 16, p 1034 ( 1988) both before and after carbonization. As used herein "carbonization" is a process in which the resin system begins to form char materials when exposed to a temperature of 1000° C. from a temperature of 25° C. at a rate of 20° C./min in an Argon atmosphere. (See Example 14) The thermal conductivity before carbonization is general less than about 60 w/mk, and after carbonization is from less than about 60 to about 0.001 w/mk and the change in conductivity on carbonization is equal to or less than about 60 w/mk. In the preferred embodiments of the invention, the thermal conductivity before carbonization is equal to or less than 40 w/mk, after carbonization is from less than about 40 to about 0.0001 w/mk and the change in thermal conductivity on carbonization is equal to or less than about 40 w/mk. In the more preferred embodimentds of the invention, the thermal conductivity before carbonization is 30 w/mk, after carbonization is from less than about 30 to about 0.001 w/mk and the change in thermal conductivity on carbonization is less than about 30 w/mk. In the most preferred embodiments of the invention, the thermal conductivity before carbonization is equal to or less than about 20 w/mk, after carbonization is from less than about 20 to about 0.01 w/mk and the change in thermal conductivity on carbonization is less than about 20 w/mk.

The composition also maintains its mechanical properties i.e. density and dimensions, to a significant extent on carbonization. For example, change in density and dimensions (thickness) is preferably less than about 30%, preferably less than about 20% and most preferably less than about 10%.

The fire retardant composition comprises two essential ingredients. One of the essential ingredients is a compoind which exhibits an "endothermic effect" upon heating, or a mixture of such compounds. As used herein, a compound which exhibits an "endothermic effect" is whic absorbs heat when exposed to fire or heat. Endothermic effect can be measured by means of calorimetry. The net energy absorbed can be expressed in term of joules per gram of compound (J/gm). In general, the endothermic effect greater than 0 J/gm. In the preferred embodiments of the invention, the endothermic effect of the compound is greater than about 1 J/gm and in the more preferred embodiemtns of the invention, the endothermic effect is from about 1 J/gm to about 1000KJ/gm. In the most preferred embodiments of the invention, the endothermic effect is from about 100 J/gm to about 100KJ/gm.

In addition to the endothermic effect, it is preferred that on heating or exposure to flame the compounds produce inflammable gases such as carbondioxide, steam, sulfur dioxide, nitrogen, carbon monoixde, nitrous oxide, ammonia and the like. A result is that the composition is converted into a porous structure (containing pockets of gas) preferably having a low heat thermal conductivity (preferably below at about 30 w/mk, more preferably from about 0.001 to about 20 w/mk, and most preferably from about 0.01 to 10 w/mk as measured by the method of Khanna et al.).

Useful fire retardant agents may vary widely. Illustrative of useful agents are such materials as metal hydroxides and hydrated materials such as magnesium hydroxide, calcium hydroxide, alumina trihydrate, calcium nitrate hydrate, lithium hydroxide monohydrate, and the like; carbonates and bicarbonates such as potassium carbonate, magnesium carbonate, calcium carbonate, potassium bicarbonate, sodium bicarbonate, cadmium bicarbonate, cobalt carbonate hydrate, erbium carbonate hydrate, europium carbonate hydrate, lanthanum carbonate hydrate, lithium carbonate and nickel carbonate hydroxide tetrahydrate; metal nitrate hydrates such as europium nitrate hexahydrate neodymium nitrate hexahydrate, cadmium nitrate tetrahydrate, calcium nitrate hydrate, cobalt nitrate hydrate, cerium nitrate hydrate, chromium nitrate hydrate, copper nitrate hydrate, erbium nitrate pentahydrate; metal halide hydrates as such erbium chloride hexahydrate, europium chloride tetrahydrate, lanthanum chloride heptahydrate, indium chloride hexahydrate, cadmium bromide tetrahydrate, calcium chloride hydrate, calcium chloride dihydrate, calcium bromide hydrate, calcium iodide hydrate, cobalt chloride hexahydrate, chromium chloride hexahydrate, and cobalt bromide hydrate; metal sulfate hydrates such as europium sulfate hydrate, indium sulfate hydrate, cerium sulfate hydrate, cadium sulfate dihydrate, chromium potassium sulfate dodecahydrate, chromium sulfate hydrate, copper sulfate pentahydrate and erbium sulfate hydrate; metal perchlorate hydrates such as copper perchlorate hexahydrate, maganese perchlorate hexahydrate, and sodium perchlorate monohydrate; metal perborate hydrates such as sodium perborate tetrahydrate and the like; metal sulfites and bisufites such as potassium sulfite, sodium bisulfite, sodium sulfite and the like; metal and non-metal perchlorates such as ammonium perchlorate and the like; metal and non-metal hydroxides such as ammonium hydroxide and the like; and borates such as zinc borate and the like; phosphate salts such as sodium phosphate tribasic dodecahydrate, sodium pyrophosphate decahydrate and the like; various nitrogen containing organic compounds which thermally decompose to form nitrogen gas such as dinitrosopentamethylenetetramine (DNPT), azodicarbonamide, p-toluenesulfonyl semicarbazide, 5-phenyltetrazole, diisopropylhydrazodicarboxylate, p-toluenesulfonyl hydrazide, 4-4'-oxybis (benzene sulfinyl hydrazide), 5-phenyl-3,6-dihydro-1,3,4-oxadiazin-2-one, and hydroxyazoalkanes.

Preferred flame retardant agents are metal hydroxides and hydrated materials, carbonates, bicarbonates, nitrate hydrates, metal halide hydrates, sulfate hydrates, perchlorate hydrates, phosphate hydrates, sulfites, bisulfites, borates, perchlorates, hydroxides, phosphate salts, and nitrogen containing compounds which thermally decomposes to form nitrogen. More preferred flame retardant agents are hydroxides, hydrates, carbonates, bicarbonates, sulfites, and bisulfites. Most preferred flame retardant agents are hydroxides, carbonates, bicarbonates and hydrates, with hydrated flame retardant agents being the agents of choice.

The judicious selection of fire retardants depends on a number of factors which include their efficiency and decomposition characteristics. Blends of several types of fire retardants provide a viable means to generate systems offering a wide spectrum of thermal decomposition behavior and additional beneficial chemical reactions. For example, a mixture of magnesium nitrate and sodium carbonate would react as follows.

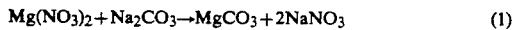

$$Mg(NO_3)_2 + Na_2CO_3 \rightarrow MgCO_3 + 2NaNO_3 \quad (1)$$

$$MgCO_3 \rightarrow MgO + CO_2 \quad (2)$$

The incorporation of various types of catalysts, promoters or the like can lower the thermal decomposition temperature of the fire retardant or mixture of retardants to increase the fire retardant's efficiency.

In the prefered embodiments the fire retardant is reusable after use. For example, when exposed to fire, Mg(OH)$_2$ decomposes at about 320° C. forming MgO and water which is a fire retardant. Once the fire is removed or extinguished, the MgO can be hydrated with water to form magnesium hydroxide as follows:

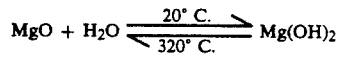

$$MgO + H_2O \underset{320°\,C.}{\overset{20°\,C.}{\rightleftarrows}} Mg(OH)_2$$

Furthermore, the various fire retardants can be recycled such that the mechanism of fire retardance can be changed in the recycling. For example, magnesium carbonate decomposes on exposure to fire to form MgO and CO$_2$ gas. Afterwards, Mg(OH)$_2$ is formed on the reaction of the residual MgO with water. Thereafter, on exposure to a second fire, Mg(OH)$_2$ decomposes to form water in the gaseous and MgO.

The flame retardant agent is preferably in particulate form. Particle size may vary widely and is not critical. Usually flame retardant particle sizes are from about 0.001 microns to about 1000 microns. Preferred particle size are from about 0.01 to about 500 microns, more preferred particle sizes are from about 0.1 to about 100, and most preferred particle sizes are from about 0.1 to about 50 microns.

The flame retardant agent is preferably dispersed in a non-flammable polymeric matrix. As used herein, "non-flammable" means that the matrix material will not ignite when subjected to the Torch Test (See the Example). The type of polymer used to form the matrix may vary widely, the only requirement is that the material is non-flammable. In the preferred embodiments of the invention, the polymeric matrix material exhibits high temperature performance and high char yield. In the preferred embodiments of the invention, the matrix material and the fire retardant agent forms a reactive system. When it is subject to severe heating or exposed to flame, the fire retardant forms a gaseous by-product which converts the matrix material into a porous structure maintaining to a large degree its dimensions. This porous structure exhibits sufficient mechanical integrity, and a relatively low thermal conductivity (less than 30 w/mk, preferably from about 0.001 to about 20 w/mk, more preferably from about 0.01 to about 10 w/mk as determined by differential scanning calorimetry (DSC) using the procedure of Y. P. Khanna, et al, *Polymers Engineering and Science*, vol 16, p 1034 (1988)). The porous structure reduces the transfer of heat to the underlying fibrous layer 12.

Useful polymers for forming the matrix include those discussed above for formation of the matrix of fibrous layer 12 which are non-flammable. Illustrative of such non-flammable polymers are thermoplastic polymers such as halopolymers as for example poly(tetrafluoroethylene) and copolymers thereof, and aromatic polyamides and polyesters such as poly(metaphenylene isophthalamide) poly(p-terephthalamide), poly (para-hydroxy benzoate) and aromatic liquid crystalline polymers. Useful non-flammable polymers also include thermosetting resins such as unsaturated polyesters, phenolics, epoxies, allylics, alkyds, aminoplastics, polyimides and the like, especially aromatic thermosets such as, phenolics, aminoplastics, polyimides, and the like.

Preferred matrix materials are thermosetting resins and more preferred matrix materials are aromatic themosetting resins. Most preferred materials for use in the practice of this invention are non-flammable in the Torch Test. These most preferred materials also produce no or substantially no smoke and toxic gases under BSS 7239 and BSS 7238 (an optional density or Ds at 4.0 minutes equal to or less than about 500, preferably equal to or less than about 200, more preferably equal to or less than about 80 and most preferably equal to or less than about 50 under BSS 7238, and toxic gases less than 3500 ppm carbon monoxide, 100 ppm nitrogen dioxide, 100 sulfur dioxide, 500 ppm hydroge chloride, 200 hydrogen fluoride and 150 ppm hydrogen cyanide using the procedure of BSS 7239). These preferred compostions also exhibit reduced thermal conductivities on carbonization (generally less than about 30 w/mk, preferably less than about 20 w/mk, more preferably from about 0.001 to about 20 w/mk, and most preferably from about 0.01 to about 10 w/mk) as measured by the procedure of Y. P. Khanna, et al, *Polymers Engineering and Science*, vol 16, p 1034 (1988), and exhibit reduced changes in dimension (i.e. density and thickness) on carbonization (general less than about 30%, preferably less than about 20%, more preferably less than about 10% and most preferably less than about 5%).

In the preferred embodiments of the invention, the matrix material exhibits a net endothermic effect; that is the material absorbs heat when subjected to heat or a flame. The amount of heat absorbed is greater than about 0 J/gm as measured by differential scanning salorimetry (DSC). In the preferred embodiments of the invention, the net endothermic effect is greater than about 1 J/gm, and in the more preferred embodiments of the invention the net endothermic effect is from about 1 J/gm to about 1000KJ/gm. In the most preferred embodiments of the invention, the net endothermic effect is from about 100 J/gm to about 100KJ/gm.

The nature of the net endothermic effect may vary widely. For example, the effect may arise from carbonization reactions, endothermic decomposition reactions, curing reactions, combinations of the foregoing reactions and the like. In the most preferred embodiments of the invention where the matrix material is a partially cured or completely cured thermoset material, the endothermic effect arises predominantly from carbonization and curing of the matrix material. In these embodiments, the matrix material is selected from the group consisting of partially cured thermosetting resins i.e. those in which less than about 100% of curable groups are cured as shown by the procedure of J. F. Rabek, "*Experimental Methods in Polymer Chemistry*", Wiley and Sons, New York, N.Y., (1980). The degree of curing will vary widely depending on a number of factors such as the consistency of the material. In general, the degree of cure is equal to or less than about 0.5. In the preferred embodiments of the inventions, the degree of cure is from about 0.15 to about 0.50 and in the more preferred embodiments of the invention the degree of cure is from about 0.25 to about 0.50. In these embodiments of the invention the degree of cure is from about 0.30 to about 0.50 with those embodiments in which the degree of cure is from about 0.40 to about 0.50 being the embodiments of choice. In these embodiments of the invention, the partially cured resin further cures on subjection to heat and/or flame absorbing heat and decreasing the amount of heat transmitted to fibrous layer 12. The further cured resin which is formed is usually more resistance to the transmission of heat than the partially cure material which further enhances the effectiveness of layer 14. Illustrative of such most preferred matrix materials are those which are formed by cyclotrimerization of aromatic polycyanates, most preferably those containing phenolic resins of the type described in U.S. Pat. Nos. 4,002,755, 4,831,086, and 3,444,137; W0871443; and PCT 87/001236. These resins can be used continuously at relatively high temperatures most preferably higher than about 500° F. The high temperature performance arises from two sources, the inherently high aromatic content of the phenolic resin and the triazine ring structure resulting from trimerization of cyanate groups, unlike other high temperature resins, these resins are easily processable using conventional equipment.

These phenolic cyanate resins are generally of the following Formula I:

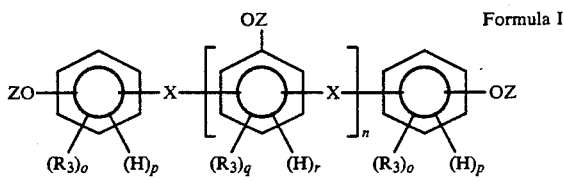

Formula I wherein:

n is a positive whole number greater than or equal to 1;

q and r are the same or different at each occurence and are whole numbers from 0 to 3, with the proviso that the sum of q and r at each occurrence is equal to 3;

Z is —CN, hydrogen and —CN;

o and p are the same or different at each occurrence and are whole numbers from 0 to 4 with the proviso that the sum of o to p at each occurrence is equal to 4;

—X— is a divalent organic radical; and $R_3$ is the same or different at each occurrence and is a substituent other than hydrogen.

In the structure of Formula I, $R_3$ is a substituent other than hydrogen. Illustrative of suitable $R_3$ groups are such substituents as halogen, trihalomethyl, cyano, alkyl, alkoxy, phenyl alkynyl, isocyanate, and the like.

Illustrative of suitable —X— groups are alkylene such as methylene, ethylmethylene, 2-ethylpentylmethylene, methylmethylene, isopropylmethylene, isobutylmethylene, pentylmethylene, and furylmethylene, and the like; arylenes such as 1, 3-benzenedimethylene, phenylmethylene, 1,4-benzendimethylene, 2,2-bis-(4-phenylene) propane, 4-methoxyphenylmethylene, bis-(4-phenylenemethane), 4,4-diphenylene dimethylethane; and cycloalkylenes such as cyclohexylene, cyclooctylene, and 1,3-cyclohexane-dimethylene, and the like.

Preferred are those embodiments of Formula I in which:

Z is —CN, or hydrogen and —CN, preferably when Z is hydrogen and —CN from about 5 to about 100 mole percent of the Z moieties are —CN;

—X— is 1,4-phenyldimethylene substituted or unsubstituted methylene wherein permissible substituents are alkyl, benzene, halogen, or furyl —O—,—SO$_2$—,—S—,—S—S—,—C(O)—,—OC-(O)— or —C(O)O— q and r are the same or different at each occurrence and are positive whole numbers from 0 to 3, with the proviso that the sum of q and r is 3;

$R_3$ is alkyl;

n is a positive integer from 1 to about 10; and o and p are the same or different at each occurrence and are positive integer from 0 to 4, with the proviso that the sum of o and p is 4.

Amongst the preferred embodiments, particularly preferred are those embodiments of above Formula I in which:

Z is hydrogen, or hydrogen and —CN with the proviso that from about 20 to about 100 mole percent of Z moieties are —CN;

—X— is methylene, methylene substituted with alkyl having from about 1 to about 10 carbon atoms, benzene, halogen or furfuryl, or xylene;

$R_3$ is methyl or ethyl;

o is 0 or 1;

p is 0 or 1;
n is 1 to about 8, and more preferably 1 to 6;
q is 0 or 1
r is 1 to 3; and
p is 1 to 4.

Other preferred embodiments are those embodiments of the Formula I wherein:
n is 1 to about 5;
Z is —CN or hydrogen and —CN with the proviso that from about 60 to about 100 mole percent Z moieties are CN;
q is 0;
o is 0; and
X is methylene, methylene substituted with one or more alkyl of 1 to 1% carbon atoms, halogen, benzene or furfuryl or xylene,
is 3; and
p is 4.

The amount of fire retardant agent loaded into the matrix may vary widely. In general, the greater the amount of agent and the greater the amount of inflammable gas produced per mole of agent the higher the degree of fire retardance. Conversely, the lower the amount of agent and the lower the amount of gasous decomposition products produced by the agents per more the lower the degree of fire retardance. In general, the amount of agent is at least about 1 weight percent based on the total weight of the fire retardant layer. In the preferred embodiments of the invention, the amount of agent is from about 1 to about 99 weight percent based on the total weight of the fire retardant layer, and in the particularly preferred embodiments of the invention, the amount of agent is from about 5 to about 95 weight percent on the aforementioned basis. In the most preferred embodiments of the invention, the amount of agent is from about 10 to about 90 weight percent based on the total weight of the fire retardant layer.

Fire retardant layer 14 can be formed using conventional techniques for formation of polymer blends in multi-layers. Such polymer blending techniques are known in the art and will not be described herein in detail.

Each layer 14 may be composed of one or more different polymers with one or more fire retardant agents which decompose on heating to form one or more inflammable gasous materials. The selection of specific components of layer 14 and construction of layer 14 depends on application. The efficiency and decomposition behavior of layer 14 can be tailored to suit a specific application by proper selection of polymer and fire retardant and by addition of a catalyst or promoters. For example, sodium bicarbonate decomposes between 100° C. to 140° C. with the evolution of $CO_2$ and $H_2O$, forming sodium carbonate. The theoretial gas yield is 267 $CM^3$/gm, but thermal decomposition normally yields only about 135 $cm^3$/gm. At a temperature of 140° C., decomposition becomes more rapid. The rapid diffusion of $CO_2$ makes the production of a stable closed cells extremely difficult. The addition of an equivalent amount of acid to the sodium bicarbonate increases the gas yield.

The shape of fire retardant layer 14 and the area percent of fibrous layer 12 bonded to fire retardant layer 14 may vary widely. For example, fire retardant layer 14 may be in the form of a sheet or sheet-like (e.g. contiguous or overlapping ribbons, steps, squares and the like which form a sheet-like layer) which is bonded to or in contract with b 100 percent or substantially one hundred percent of a surface of fibrous layer 12. Alternatively, layer may be formed from a plurality of various geometrically shaped polymeric bodies (e.g. ribbons, hexagons, triangles, rectangles, squares, strips) which cover less than 100% of the surface of fibrous layer 12. In the preferred embodiments of this invention, fire retardant layer 14 is formed from sheets, strips, ribbons and the like and is bonded to a least about 5 area percent of a major surface of fibrous layer 12. In the more preferred embodiments of the invention, fire retardant layer 14 is bonded to at least about 20 area percent of a major surface of fibrous layer 12, and in the most preferred embodiments of the invention, fire retardant layer 14 is bonded to at least about 50 area percent of a major surface of fibrous layer 12. In the embodiments of choice, fire retardant layer 14 covers at least 95 area percent of a major surface of fibrous layer 12.

While not an essential component, fire retardant layer 14 may itself comprise a network of fibers as described for use in the fabrication of fibrous layer 12 dispersed in the polymeric matrix. Fibers for inclusion in fire retardant layer 14 are preferably formed from non-flammable materials. As used herein, "non-flammable" means material is not ignited when exposed to flame in the Torch Test. Such materials include non-flammable metallic materials, semi-metallic materials, non-metals materials and organic materials. Illustrative of useful and preferred inorganic fibers are S-glass fibers, $S_2$ glass fibers, silicon carbide fibers, asbestos fibers, basalt fibers, E-glass fibers, alumina fibers, alumina-silicate fibers, quartz fibers, zirconia-silica fibers, boron fibers, carbon fibers, graphite fibers, non-alkaline aluminoborosilicate fibers, soda borosilicate fibers, soda silicate fibers, soda lime-aluminosilicate fibers, lead silicate fibers, non-alkaline lead boroalumina fibers, non-alkaline barium boroalumina fibers, non-alkaline zinc boroalumina fibers, non-alkaline iron fibers, cadmium borate fibers and the like. Exemplary of useful metallic or semi-metallic fibers are those composed of boron, aluminum, steel and titanium.

Illustrative of useful organic filaments are those composed of highly aromatic thermosetting and thermoplastic polymers such as for example, poly(metaphenylene isophtahalamide) (Nomex®), poly(p-phenylene terephtahalamide) (Kevlar®) and liquid crystalline polymers such as liquid crystal copolyesters, aromatic polyamides, and the like.

Preferred fibers are aramid fibers, liquid crystal polyester fibers and glass fibers such as E-glass and S-glass. Suitable aramid fibers formed principally from aromatic polyamide are described in U.S. Pat. No. 3,671,542, which is hereby incorporated by reference. Preferred aramid filament will have a tenacity of at least about 20 g/d, a tensile modulus of at least about 400 g/d and an energy-to-break at least about 8 joules/gram, and particularly preferred aramid fibers will have a tenacity of at least about 20 g/d, a modulus of at least about 480 g/d and an energy-to-break of at least about 20 joules/gram. Most preferred aramid fibers will have a tenacity of at least about 20 g/denier, a modulus of at least about 900 g/denier and an energy-to-break of at least about 30 joules/gram. For example, poly(phenylene terephthalamide) fibers produced commercially by Dupont Corporation under the trade name of Kevlar® 29, 49, 129 and 149 having moderately high moduli and tenacity values are particularly useful in forming ballistic resistant composites. Also useful in the practice of this invention is poly(metaphenylene isophathalamide) fibers produced commercially by Dupont under the tradename Nomex ®.

Suitable liquid crystal copolyesters, fibers are disclosed, for example, in U.S. Pat. Nos. 3,975,487; 4,118,372; and 4,161,470, hereby incorporated by reference. Tenacities of about 15 to 30 g/d and preferably about 20 to 25 g/d, and modulus of about 500 to 1500 g/d and preferably about 1000 to 1200 g/d, are particularly desirable.

Most preferred fibers are formed from inorganic materials. Of these, glass fibers are the fibers of choice.

In these embodiments of the invention, in which fire retardant layer 14 includes fibers, the fibers are dispersed in a continuous phase of matrix material which preferably substantially coats each filament contained in the bundle of filament. The manner in which the fibers are dispersed may vary widely. The fibers may be aligned in a substantially parallel, unidirectional fashion, or fibers may be aligned in a multidirectional fashion with filaments at varying angles with each other. In the preferred embodiments of this invention, fibers in each fire retardant layer 14 are aligned in a substantially parallel, unidirectional fashion such as in a prepreg, pultruded sheet and the like. One such suitable arrangement is where fire retardant layer 14 comprises a plurality of layers or laminates in which the coated fibers are arranged in a sheet-like array and aligned parallel to one another along a common fiber direction. Successive layers of such coated, uni-directional fibers can be roated with respect to the previous layer. An example of such laminate fire retardant layer 14 are composites with the second, third, fourth and fifth layers roated +45°, −45°, 90° and 0°, with respect to the first layer, buy not necessarily in that order. Other examples include composites with 0°/90° layout of yarn or filaments.

Articles 10 of this invention can be fabricated using a number of procedures. For example, the layers are formed by molding the combination of layers and fibrous layers in the desired configurations and amounts by subjecting the combination to heat, and pressure during a mold cycle time. The molding temperature is critical and is usually selected such that it is less than the melting or softening point of the polymer from which the fibers of fibrous layer 12 and/or fire retardant layer 14 are formed of or the temperature at which fiber damage occurs, but is greater than the melting point or softening point of the polymer or polymers forming the polymeric layer(s). For example, for extended chain polyethylene filaments, molding temperatures range from about 20° to about 150° C., preferably from about 80° to about 145° C., more preferably from about 100° to about 135° C. The molding pressure may vary widely and preferably may range from about 10 psi (69 kPa) to about 10,000 psi (69,000 kPa). A pressure between about 10 psi (69 kPa) and about 100 psi (690 kPa), when combined with temperatures below about 100° C. for a period of time less than about 1.0 min., may be used simply to cause the fibrous layers and polymeric layers to stick together. Pressures from about 100 psi to about 10,000 psi (69,000 kPa), when coupled with temperatures in the range of about 100° to about 155° C. for a time of between about 1 to about 5 min., may cause the filaments of the fibrous layers to deform and to compress together (generally in a film-like shape). Pressures from about 100 psi (690 kPa) to about 10,000 psi (69,000 kPa), when coupled with temperatures in the range of about 150° to about 155° C. for a time of between 1 to about 5 min., may cause the film to become translucent or transparent. For polypropylene filaments, the upper limitation of the temperature range is preferably about 10° to about 20° C. higher than for ECPE filament and for aramid fibers, the upper limitation of the temperature range is preferably about 20° C. to about 30° C. higher than for ECPE fibers.

Fibrous layer 12 may be bonded to fire retardant layer 14 by any suitable bonding means known to those of skill in the art. Illustrative of useful 10 attaching mans are adhesive such as those described in Liable, Chapter 6, supra, bolts, screws, mechanical interlocks adhesives such as metal and non-metal adhesives, organic adhesives and the like. In the preferred embodiments of this invention, attaching means is selected from the group consisting of adhesive bonding agents formed the matrix material forming layers 12 and 14.

The number of layers 12 and 14 included in article 10 of this invention may vary widely depending on the uses of the article, for example, in those uses where the would be used as ballistic protection desired and other factors known to those of skill in the ballastic protection are. In general for this application, the greater the degree of protection desired the greater the number of layers included in the article for a given weight of the article. Conversely, the lessor the degree of ballistic protection required, the lessor the number of layers required for a given weight of the article.

FIG. 2 shows a variant of the embodiment of FIG. 1 which is indicated at 16. Article 16, comprises a fibrous layer 18 bonded on one side by fire retardant layer 20 and bonded on the other side by fire retardant layer 22. Fibrous layer 18 is as described herein above for fibrous layer 12 of the embodiment of FIG. 1. Fire retardant layers 20 and 22 can be fabricated from the same or different materials and are as described herein above for fire retardant layer 14 of the embodiment of FIG. 1.

Figure 3:
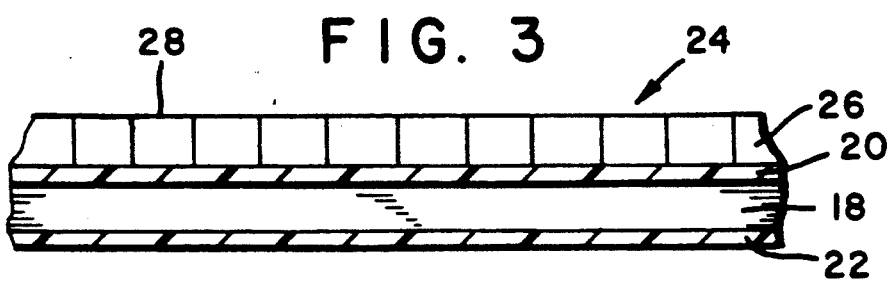
FIG. 3 is a fragmentary view in cross-section of a modified embodiment of this invention which includes a rigid hard impact layer.

FIG. 3 depicts an armor article 24 which differs from article 16 of FIG. 2 by the inclusion of a hard impact layer 26, corresponding parts being referred to by like numerals. Layer 26 is formed from a plurality of planar bodies 28 composed of a hard material having a hardness of at least about a Brinnell hardness of 25 or a Mohs hardness of 2 and functions to shatter, blunt or crack the impacting projectile. Useful materials for the farbicationn of layer 26 may vary widely and include materials normally used in the fabrication of ballistic resistant armor which function to partially deform the initial impact surface of a projectile or cause the projectile to shatter. Such materials include metals such as steel, titanium, aluminum and the like and non-metal ceramic materials such as those described in C. F. Liable, *Ballistic Materials and Penetration Mechanics*, Chapters 5–7 (1980) and include single oxides such as aluminum oxide ($Al_2o_3$), barium oxide (BaO), beryllium oxide (BeO), calcium oxide (CaO), cerium oxide ($Ce_2O_3$ and $Ce_2O$), chromium oxide ($Cr_2O_3$), dysprosium oxide ($Dy_2O_3$), erbium oxide ($Er_2O^3$), europium oxide: (EuO, $Eu_2O_3$, and $Eu_2O_4$), ($Eu_{16}O_{21}$), gadolinium oxide ($Gd_2O_3$), hafnium oxide ($HfO_2$), holmium oxide ($Ho_2O_3$), lanthanum oxide ($La_2O_3$), lutetium oxide ($Lu_2O_3$), magnesium oxide (MgO), neodymium oxide ($Nd_2O_3$), niobium oxide: (NbO, $Nb_2O_3$), ($Nb_2O_5$), plutonium oxide: (PuO, $Pu_2O_3$, and $PuO_2$), praseodymium oxide: ($PrO_2$, $Pr_6O_{11}$, and $Pr_2O_3$), promethium oxide ($Pm_2O_3$), samarium oxide (SmO and $Sm_2O_3$), scandium oxide ($Sc_2O_3$), silicon dioxide ($SiO_2O$, strontium oxide (StO), tantalum oxide ($Ta_2O_5$), terbium oxide ($Tb_2O_3$ and $Tb_4O_7$), thorium oxide ($ThO_2$), thulium oxide ($Tm_2O_3$), titanium oxice: (TiO, $Ti_2O_3$, $Ti_3O_5$ and $TiO_2$), uranium oxide ($Uo_2$, $U_3O_8$ and $UO_3$), vanadium oxide (Vo, $V_2O_3$, $VO_2$ and $V_2O_5$), ytterbium oxide ($Yb_2O_3$), yttrium oxide ($Y_2O_3$), and zirconium oxide ($ZrO_2$). Useful ceramic materials also include boron carbide, aluminum beride, aluminum carbide, boron carbide, silicon carbide, aluminum carbide, titanium nitride, boron nitride, titanium carbide, titanium diboride, iron carbide, iron nitride, barium titanate, aluminum nitride, titanium niobate, boron carbide, silicon boride, barium titanate, silicon nitride, calcium titanate, tantalum carbide, graphites, tungsten; the ceramic alloys which include cordierite/-MAS, lead zirconate titanate/PLZT, alumina-titanium carbide, alumina-zirconia, zirconia-cordierite/ZrMAS; the fiber reinforced ceramics and ceramic alloys; glassy ceramics; as well as other useful materials. Preferred are non-metal and metal ceramic materials. Preferred ceramic materials are aluminum oxide, and metal and non-metal nitrides, borides and carbides.

Figure 4:
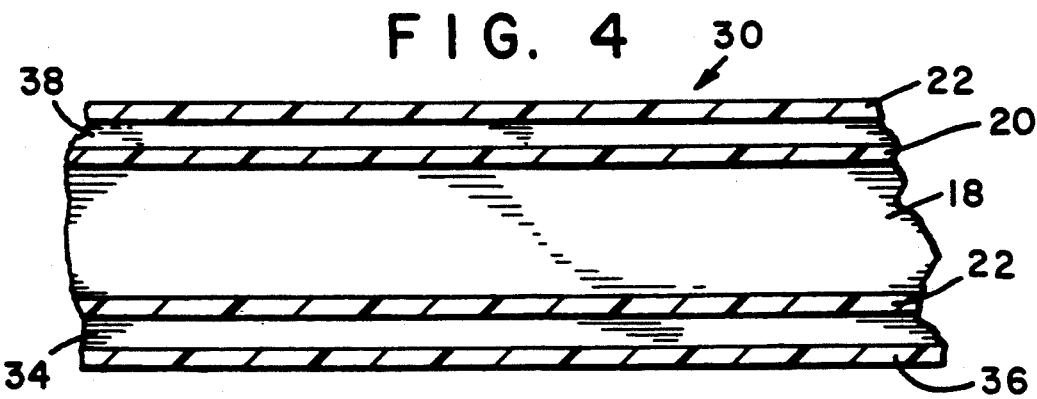
FIG. 4 is a fragmentary view in cross-section of an embodiment of this invention having multiple fire retardant layers.

FIG. 4 depicts a ballistic resistant article 30 which differs from article 16 of FIG. 2 by the inclusions of layers 32,34, 36 and 38 corresponding parts being referred to by like numbers. Surface layers 32 and 36 coat article 30 and function as the initial barrier to heat and flame. Layers 32 and 36 are preferably formed of a refractory material as for example ceramic materials used to form impact layer 26 of article 24. Such materials are generally applied to form layers 32 and 36 in the form of refactory ceramic paints, as for example Fiberfrax ® coating cement made by Carborundum, Inc. Such paints or coatings are usually comprised of a refractory ceramic material dispersed in a liquid vehicle comprised of a liquid and a polymeric binder. In the preferred embodiments of the invention, the various components of the paint or coating are selected such that the paint or coating forms or expands on heating decreasing the thermal conductivity of the coating to levels preferably less than about 30 w/mk, more preferably less than about 20 w/mk and most preferably less than about 10 w/mk. Layers 20 and 22 are the same or different and are as described above in the description of article 16 of FIG. 2. In the embodiment of FIG. 4, layers 20 and 22 are preferably formed of a fire retardant composition comprised of a particulate material such as $Mg(OH)_2$ which produces a non-flammable gas when heated or exposed to flame in a resin matrix preferably a partially cured thermosetting resin, such are the phenolic cyanate resin described in U.S. Pat. No. 4,831,086.

Layer 18 is a described above and consists of a ballistically effective fiber filled polymeric composite such as a polymeric matrix consist of a mixture of a thermosetting resin as for example a vinyl ester resin and a thermoplastic resin such as a polyurethane filled with a flammable fiber such as extended chain polyethylene fibers as for example, Spectra ® 900 and Spectra ® 1000 polyethylene fibers or with an inflammable fiber which generates smoke and toxic gases when exposed to heat and/or flame such as aramid fibers as for example Kevlar ® 29, 49, 129 or 149 aramid fibers or fibers formed from polyimides and halogenated materials such as polyvinyl chloride.

Outer surface protective layers 34 and 38 are the same or different and are formed from materials selected from the group consisting of permissible materials for the fabrication of Layer 14 of FIG. 1, and of Layers 20 and 22 of FIGS. 2 to 4. In the preferred embodiments of the invention, layers 34 and 38 function to protect layers 20 and 22 from heat and flame for time sufficient to allow the partially cured matrix material of layers 20 and 22 to further cure so that layers 20 and 22 can achieve enhance high temperature resistance. Layers 34 and 38 are preferably formed from a fire retardant composition comprised of resin matrix material which generates little or no visible smoke when exposed to heat and/or flame as for example those which do not contain aromatic groups, halogens or unsaturations such as polyvinyl acetate, polyacetal, polyethylene, polypropylene and the like, filled with a particulate inorganic material which forms a non-flammable gas when exposed to heat and/or flame such as a metal hydroxide or hydrate such as $Mg(OH)_2$.

The relative volume percents of the various layers 18, 20, 22, 32, 34, 36, and 38 may vary widely. In general, layer 18 will comprise at least about 50 volume percent based on the total volume of article 30 and produces the bulk of the ballistic protection. Layer 18 preferably comprise at least about 60 volume percent, more preferably at least about 80 volume percent and most preferably at least about 9% volume percent of article 10 based on the total volume of the article.

Of the volume of article 30 formed by layers 20, 22, 32, 34, 36 and 38, layers 20 and 22 generally form at least about 50 volume percent, preferably at least about 60 volume percent, more preferably at least about 80 volume percent and most preferably at least about 90 volume percent based on the total volume of layers 20, 22, 32, 34, 36 and 38. Those embodiments in which layers 20 and 22 constitute at least about 95 volume percent of the volume of article 30 exclusive of layer 18 are the embodiments of choice.

The article of this invention can be used for conventional purposes. For example, such composites can be used in the fabrication of penetration resistance articles ballistic armor, spall liners, structural parts and the like using conventional methods.

The following examples are presented to provide a more complete understanding of the invention and are not to be construed as limitations thereon.

EXAMPLE 1

One side of 1" (2.54 cm) thick Spectra ® panel was laminated with two layers of glass fabric prepreg. The outside layer, which was 0.0417 inch (0.106 cm) thick, was impregnated with a magnesium hydroxide filled poly(vinylacetate emulsion). The weight ratio of filler/resin solid was 2:1). The inside 9lass layer, which was 0.0833 inch (0.212 cm) thick was impregnated with a magnesium hydroxide filled phenolic cyanate resin (filler/resin solid was 2:1). A K-type thermocouple was placed at the center of the panel between the Spectra ® panel and the glass layer for temperature measurement. The composite panel was molded at 125° C. for 2 hours at 1 ton (906 Kg) press pressure. The glass side of the panel was painted with a layer of a refractory ceramic coating.

The glass side of the panel was exposed to a propane torch for ten minutes. Neither visible smoke nor burning flame was observed during the entire experiment. The temperature at the interface between glass layer and Spectra ® panel was found to be 185° C. after 3 minutes and below 265° C. during the entire 10 minutes experiment.

COMPARATIVE EXAMPLE 1

The procedure of Example 1 was followed with the exception that the glass fabric prepreg was impregnated with resin without magnesuim hydroxide. The glass side of the panel was exposed to a propane torch. Smoke and flame of burning were observed during the first 10 seconds of the burning. No further smoke or fire was observed during the remainder of the experiment. The temperature at the interface between glass layer and Spectra ® panel was found to be 400° C. after only 3 minutes of burning and the temperature increased rapidly thereafter. No further temperature measurement was made because the thermocouple was detacked due to severe delamination of the composite.

EXAMPLE 2

The procedure of Example 1 was followed with the exception that the refractory ceramic coating was not applied. The temperature at the interface between the glass layer and Spectra ® panel was found to be 191° C. after 3 minutes and below 215° C. during the first six minutes of the experiment. No further temperature measurement was made because the composite was delaminated. Neither visible smoke nor burning flame was observed during the entire experiment.

EXAMPLE 3

The formulation/composition, manufacturing procedure, and test method of Example 1 were employed except that the inside glass layer was impregnated with a magnesium hydroxide filled vinyl ester resin. The resin was a mixture of Derakane ® 8087 (Dow Chemical) containing 1% Luposal peroxide (Lucidal chemcial) as the curing agent. The weight ratio of filler/resin solids was 2:1. A K-thermocouple was placed at the center of the panel between the Spectra ® panel and the glass layer for temperature measurement. The composite panel was molded at 125° C. for 2 hours at 1 ton (906 Kg) press pressure.

The glass side of the panel was exposed to a propane torch for ten minutes. The temperature at the interface between glass layer and Spectra ® panel was found to be 245° C. after 3 minutes. No further temperature measurements were made, because the thermocouple was detached due to severe delamination of the composite. Very little visible smoke and no burning flame was observed during the entire experiment.

EXAMPLE 4

The formulation/composition, manufacturing procedure, and test method of Example 2 were followed, except that the inside glass layer was impregnated with a magnesium hydroxide filled epoxy resin. The resin was a mixture of DER 331 ® and 26 pph of methylene dianiline (Aldrich Chemical) as the curing agent. The weight ratio of filler to resin solids was 2:1. A K-type thermocouple was placed at the center of the composite between the Spectra ® panel and the glass layer for temperature measurement. The composite panel was molded at 125° C. for 2 hours at 1 ton (906 Kg) press pressure.

The glass side of the panel was exposed to a propane torch for ten minutes. The temperature at the interface between glass layer and Spectra ® panel was found to be 285° C. after 3 minutes. No further temperature measurement were made because the thermocouple was detached due to severe delamination of the composite. Visible smoke but no burning flame was observed during the experiment.

EXAMPLE 5

The formulation/composition, manufacturing procedure, and test method of Example 2 were employed, except that the inside glass layer was impregnated with a magnesium hydroxide filled one step phenolic resole clear resin (Schenectady Chemicals). The weight ratio of filler to resin solids was 2:1. A K-type thermocouple was placed at the center of the panel between the Spectra ® panel and the glass layer for temperature measurement. The composite panel was molded at 125° C. for 2 hours at 1 ton (906 Kg) press pressure.

The glass side of the panel was exposed to a propane torch for ten minutes. The temperature at the interface between glass layer and Spectra ® panel was found to be 250° C. after 1 minute. No further temperature measurements were made because the thermocouple was detached due to severe delamination of the composite. Little visible smoke but no burning flame was observed during the experiment.

EXAMPLE 6

The formulation/composition, manufacturing procedure, and test method of Example 1 was followed, except that the inside glass layer was impregnated with a magnesium hydroxide filled PMR-15 polyimide resin (Dexter Composites). The weight ratio of filler to resin solids was 2:1. A K-type thermocouple was placed at the panel between the Spectral ® panel and the glass layer for temperature measurement. The composite panel was molded at 125° C. for 2 hours at 1 ton (906 Kg) press pressure.

The glass side of the panel was exposed to a propane torch for ten minutes. The temperature at the interface between glass layer and Spectra ® panel was found to be 320° C. after 2 minutes. No further temperature measurements were made because the thermocouple was detached due to severe delamination of the composite. Little visible but no smoke burning flame was observed during the experiment.

EXAMPLE 7

Using the composite of Example 1, experiments were carried out to measure the smoke intensity using the Hot Metal Balls (spall) Contact Test. The spall materials used were ½ lbs (0.227 kg) of ¼" (0.635 cm) diameter copper balls and 2 lbs (0.908 kg) of 1" (2.54 cm) diameter aluminum balls which were purchased from Specialty Products International (Keene, N.H.). Table 1 gives the description of the spall materials used.

TABLE 1

| | Simulated Spall Materials | | | |
|---|---|---|---|---|
| Material | Diameter in (cm) | Type | Grade | Purity |
| Copper Ball | ¼ (0.635) | 101 | 200 | 99.9% |
| Aluminum Ball | 1 (2.54) | 2017 T4 | 200 | — |

In the test, the test panel was positioned horizontally in a NBS smoke chamber prior to the onset of testing. On its surface, a 4 in (10.16 cm) inside diameter and 8 in (20.32 cm) outside diameter annular fixture was placed to serve as a guide for dropping the hot metal balls on to the designated areas. Separately, the ½ lb (0.227 kg) of copper balls were heated to 560° C. and the 2 lbs (0.908 kg) of the aluminum balls were heated to 360° C. by a gas burner.

In the test, the aluminum balls were first dropped on the 8 in (20.32 cm) outside diameter areas and the copper balls were dropped on the 4 in (10.16 cm) diameter areas. The chamber door was immediately closed and the smoke and toxic gas generated from the test panels were recorded.

The calculated surface temperature of the metal balls for both tests is given in Table 2.

TABLE 2

Surface Temperature of the Metal Balls on the Sample Surface, Spectra ® Panel °C.

| | Metal Temperature of the Sample, °C. | | |
|---|---|---|---|
| | Required | Initial | Calculated |
| Copper Balls | 500.0 | 560.0 | 516.0 |
| Aluminum Balls | 300.0 | 360.0 | 314.0 |

The NBS smoke density measurement, as described in Boeing test specification BSS 7238, is used to evaluate the amount smoke generated during the hot spall contact test. This test is the standard test for materials used in the interiors of civil aircraft. The results of the test are given in Table 4.

In Table 3, the abbreviations have the following meanings:

(1) $Ds$ (Specific optical density) $= \frac{V}{LA} \log_{10} \frac{100}{T}$ where
V is the chamber volume;
L is Light path length;
A is the exposed specimen area; and
T is % light transmission;

(2) Dm is the maximum specific optical density whose value is calculated using the minimum light transmittance observed during the test; and (3) Dm (corr) is Dm-Dc, where Dc is the specfic optical density corresponding to the "clean beam" reading, TC, observed at the end of the test.

TABLE 3

Smoke Generation from Spectra ® Composite During Hot Spall Contact Test

| Properties | Value |
|---|---|
| % Transmittance (min) | 46 |
| Dm (corrected) | 45 |
| Time to Dm (mins) | 5.0 |
| Ds @ 1.5 minutes | 42 |
| Ds @ 4.0 minutes | 45 |
| Ds @ 16 minutes | 0.18 |

Boeing Specification BSS 7238 of Ds@4 ranges from 50-200. As indicated in Table 3, the composite of Example 1 does not release smoke under the hot spall contact test.

EXAMPLE 8

Using the NBS chamber of Example 6 and the procedure of Boeing Specification BSS 7239, the amount of toxic gases evolved by the composite of Example 1 during the hot spall contact test was evaluated. Gas emitted during the test are collected and the toxic gas fraction is determined through analysis following the procedure described in BSS 7239. The test results are set forth in Table 4.

TABLE 4

Toxic Gases Emission from Composite During Hot Spall contact

| Gas | BSS 7239 (ppm) | Test Results (ppm) |
|---|---|---|
| Carbon Monoxide (CO) | 3500 | 18 |
| Nitrogen Dioxide (NO$_2$) | 100 | 0 |
| Sulfur Dioxide (SO$_2$) | 100 | 0 |
| Hydrogen Chloride (HCl) | 500 | 0 |
| Hydrogen Fluoride (HF) | 200 | 0 |
| Hydrogen Cyanide (HCN) | 150 | 0 |

As seen from Table 4, the only toxic gas emitted from the composite during the hot spall contact test was carbon monoxide, and its concentration was very low compared to the Boeing Specification.

EXAMPLE 9

Using the NBS chamber and procedure of Boeing Specification BSS 7238 of Example 7, the smoke generated from the composite of Example 2 is given in Table 5.

TABLE 5

Smoke Generation from Spectra ® Composite (Example 2) During Hot Spall Contact Test

| Properties | Value |
|---|---|
| % Transmittance (min) | 100 |
| Dm (corrected) | 0 |
| Time to Dm (mins) | 20 |
| Ds @ 1.5 minutes | 0 |
| Ds @ 4.0 minutes[4] | 0 |
| Dx = 16 (minutes) | — |

As seen from this Example, the composite of Example 2 without the ceramic refractory coating, generated much less smoke than the composite of Example 1 with a ceramic refractory coating.

EXAMPLE 10

Using the NBS chamber of Example 6 and the procedure of Boeing Specification BSS 7239, the amount of toxic gases evolved during the hot spall contact test for the composite of Example 2 was evaluated. Gases emitted during the test are collected and the toxic gas fraction is determined through analysis following the procedure described in BSS 7239. The test results are set forth in the following Table 6.

TABLE 6

Toxic Gases Emission from Composite During Hot Spall contact

| Gas | BSS 7239 (ppm) | Test Results (ppm) |
|---|---|---|
| Carbon Monoxide (CO) | 3500 | 4 |
| Nitrogen Dioxide (NO$_2$) | 100 | 0 |
| Sulfur Dioxide (SO$_2$) | 100 | 0 |
| Hydrogen Chloride (HCl) | 500 | 0 |
| Hydrogen Fluoride (HF) | 200 | 0 |
| Hydrogen Cyanide (HCN) | 150 | 0 |

As seen from Table 6, the only toxic from the composite during the hot spall contact test was carbon monoxide, and its concentration was very low compared to the Boeing Specification, and was even lower compared to Example 8.

EXAMPLE 11

In order to understand the temperature use behavior of various systems described in Examples 1 to 10, experiments were performed to evaluate the heat released (or exothermic heat expressed as a "negative" quantity) and heat absorbed (or endothermic heat expressed as "positive" quantity) of these systems at a temperature between 25° C. to 1000° C. using differential scanning calorimetry (DSC). The heat of the curing reaction and the heat of decomposition/carbonization reaction are the two major sources of heat observed in this temperature range. The term, "carbonization", is defined as a process in which the resin system begins to form char materials when heated from a temperature of 25° C. to a temperature of 1000° C. at a rate of 20° C./min under an Argon atmosphere as described in more detail in Example 14 below. During this procedure, char begins to form at some temperature which varies depending on the resin material.

A DuPont Thermal Analyzer equipped with a DuPont 900 DSC cell was used. The scanning rate used was 20° C./Min in Argon. The sample size ranged from 5 to 12 mg. The results are set forth in the following Table 7.

TABLE 7

| Heat | Experimental | | | |
|---|---|---|---|---|
| (J/gm) | PT[1] | VE[2] | EP[3] | PH[4] |
| Curing Reaction | −437.3 | −345.3 | −323.3 | −452.0 |
| Decomposition/Carbonization | −59.2 | +313.4 | −54.6 | −186.2 |

[1]"PT" is phenolic cyanate resin of Example 1 and 2.
[2]"VE" is the vinyl ester resin of Example 3.
[3]"EP" is the epoxy resin of Example 4.
[4]"PH" is the phenolic resin of Example 5.

EXAMPLE 12

Following the procedure of Example 11, the effect of the matrix on the thermal decomposition behavior of the fire retardant system was evaluated. The filler was magnesium hydroxide and the resins were phenolic cyanate (PT), vinyl ester (VE), epoxy resin (EP), phenolic resin (PH) and polyimide (PMR-15). The weight ratio of resin to filler was 2 to 1. The results are set forth in the following Table 8.

TABLE 8

| The Effect of Matrix on Heat Generation/Absorption Behaviour of the Matrix/Mg(OH)$_2$ System(1:2) | | | | | |
|---|---|---|---|---|---|
| Heat | Experimental Results | | | | |
| (J/gm) | PT | VE | EP | PH | PMR-15 |
| Reaction | −117.1 | −85.7 | −113.2 | −47.12 | −24.18 |
| Carbonization | 0.0 | 0.0 | −11.4 | −18.8 | 0.0 |
| Decomposition (Mg(OH)$_2$) | +764.3 | +533.4 | +561.4 | +410.6 | +374 |

Under the same test, pure Mg(OH)$_2$ absorbs about 1147 J/gm during its decomposition reaction. Therefore, at 66.7% by weight, its absorbs about 763 J/gm. As indicated in Table 8, PT resin optimizes the heat absorption of Mg(OH)$_2$ during its decomposition reaction better than all the systems evaluated.

EXAMPLE 13

Following the procedure described in Example 12, the effect of filler on thermal decomposition behavior of the fire retardant system was evaluated. The resin was a phenolic cyanate and the fillers were magnesium hydroxide, alumina trihydrate, zinc borate and basic magnesium. The weight ratio of filler to resin in the combined system was 2 to 1. The results are set forth in the following Table 9.

TABLE 9

| The Effect of Filler on Heat Generation/Absorption Behaviour | | | | |
|---|---|---|---|---|
| Parameter | MH[1] | AT[2] | ZB[3] | BMC[4] |
| Part 1: Filler | | | | |
| 1. Water Content (wt %) | 31.0 | 34.5 | 14 | 20 |
| 2. Decomposition Temperature, C. | 330 | 200 | 300–450 | 230 |
| Part II: Matrix Filler System | | | | |
| 1. Reaction | −117.1 | −120.4 | −101.4 | −122.0 |
| 2. Carbonization | 0.0 | 0.0 | 0.0 | 0.0 |
| 3. Decomposition Mg(OH)$_2$ | +764.3 | +708.3 | +298.3 | +600.0 |

[1]"MH" is magnesium hydroxide, Mg(OH)$_2$.
[2]"AT" is alumina trihydrate, Al(OH)$_3$.
[3]"ZB" is zinc borate, 2ZnO.3B$_2$O$_3$.5H$_2$O.
[4]"BMC" is basic Magnesium Carbonate, Mg$_4$(CO$_3$)$_3$(OH)$_2$.4H$_2$O.

EXAMPLE 14

In order to understand the fire resistant behaviour of the system, experiments were performed to determine the change of properties of a fire retardant layer of magnesium hydroxide (Mg(OH)$_2$) and PT resin after carbonization. In these experiments, molded sample were prepared before carbonization using the following procedure:

A small amount (~100 gm) of a mixture of PT resin (solids) and Mg(OH)$_2$ (1:2 by weight) was solution (acetone) blended vigorously for 15 minutes using a mechanical stirrer. The mixture was dried in air overnight, and the dried mixture was ground to powder. The powder was dried further in a vacuum oven at 30° C. for 16 hours at 27" Hg (91.43K pa) to remove residual solvent. The powder was further reduced with a mortar and pestle and then passed through a #200 mesh sieves. The powder was placed into a 3-piece mold with 6 rectangular cavities ($\frac{1}{4}"\times1"$) (0.635 cm×2.54 cm) and 6 circular cavities (3/16" (0.476 cm)). The depth of the cavities was 1/16" (0.159 cm). The powder was cured in the mold at 250° C. for 2 hours at 5 tons (4590 kg) pressure.

The molded samples were carbonized in an oven of a Thermal Gravimetric Analysis (TGA) equipment under Argon atmosphere. The materials were first heated from 25° C. to 1000° C. at a rate of 20° C./min heating rate. After the materials were cooled down, the materials were again heated from 25° C. to 1000° C. at a rate of 20° C./min. The carbonized materials were then evaluated in the following Examples 15 to 20.

EXAMPLE 15

Several experiments were conducted to determine the effect of the addition of the filler on char yield of the resin. The resin was a phenolic cyanate (PT), and the filler was magnesium hydroxide (Mg(OH)$_2$). The weight ratio of resin to filler in the blend was 1 to 2. The char yield was determined using a DuPont Thermogravimetric Analyzer (TGA). The sample size ranged from 15 to 25 mg. The scanning rate used was 20° C./min and the sample was heated from 25° C. to 1000° C. in Argon atmosphere. After the sample was cooled down to room temperature, the charred sample was reheated up to 1000° C. at the same heating rate. The result showed only two wt. % loss for the reheated material at 1000° C. The result of the char yield test are set forth in the following Table 10.

TABLE 10

| | Char Yield | |
|---|---|---|
| | Char Yield (%) | |
| Material | Predicted | Experimental |
| PT | — | 64.0 |
| $M_g(OH)_2$ | 69.0 | 69.0 |
| PT/$M_g(OH)_2$ | 67.4* | 62.0 |

*Pc = $W_fP_f$ + WmPm (The Rule of Mixture)

EXAMPLE 16

Using the procedure of Example 15, the effect of the matrix system on char yield was determined. The filler was magnesium hydroxide ($Mg(OH)_2$ and the resins was PT, VE, EP, PH and PMR of Examples 1,2,3,4,5 and 6, respectively. The weight ratio of resin to filler was 1 to 2. The results of the test are set forth in the following Table 11.

TABLE 11

| | Char Yield | | | | |
|---|---|---|---|---|---|
| | Char Yield (%) | | | | |
| Material | PT | VE | EP | PH | PMR |
| Value | 62.0 | 44.0 | 47.5 | 60.0 | 55.0 |

EXAMPLE 17

A series of experiments were carried out to determine the effect of carbonization on the density of a blend of PT resin and $Mg(OH)_2$ filler where the weight ratio of resin to filler was 1 to 2. The density measurement was performed by pycnometry. Water is used as the testing medium and the temperature was 23° C. Table 12 summarizes the results.

TABLE 12

| | Density Measurement | |
|---|---|---|
| | Density (gm/cm$^3$) | |
| carbonization: | measured | calculated |
| (a) Before | 1.82 | 1.93 |
| (b) After | 1.62 | 3.57 |

*Density (gm/cm$^3$): $M_gO$ = 3.580; $M_g(OH)_2$ = 2.36; PT resin = 1.05; carbon = 3.51

EXAMPLE 18

A series of experiments were carried out to determine the effect of carbonization on the porosity of a blend of a phenolic cyanate (PT) resin and magnesium hydroxide ($Mg(OH)_2$) where the weight ratio of resin to filler was 1 to 2. The porosity the sample was determined by X-ray photo spectroscopy (XPS). The results are summarized in the following Table 13.

TABLE 13

| | Porosity | |
|---|---|---|
| | Porosity (void, %) | |
| Carbonization | measured (surface, XPS) | calculated* (from density) |
| (a) Before | 6–12 | 6 |
| (b) After | 6–12 | 54.6 |

*density (gm/cc): $M_gO$ = 3.580; $M_g(OH)_2$ = 2.36; PT resin = 1.05; carbon = 3.51

EXAMPLE 19

A series of experiments were carried out to determine the effect of carbonization on the dimension of a blend of a phenolic cyanate resin and magnesium hydroxide where the weight ratio of resin to filler was 1 to 2. The results are set forth in the following Table 14.

TABLE 14

| | Dimensional Change |
|---|---|
| Carbonization | Thickness (inch (cm)) |
| (a) Before | 0.115 (0.292 cm) |
| (b) After | 0.104 (0.264 cm) |
| Total Change: | −9.5% |

EXAMPLE 20

A series of experiments were carried out to determine the effect of carbonization on the thermal conductivity of a blend of phenolic cyanate (PT) and magnesium hydroxide, where the weight ratio of resin to filler was 1 to 2. The thermal conductivity was determined by the differential scaning calorimetry (DSC) method described in Y. P. Khanna, et al. *Polymer Engineering and Science*, Vol 28, No. 16, p 1034, (1988). The results are summarized in the following Table 15.

TABLE 15

| | Thermal Conductivity (method: DSC; unit: W/(MK)) | | | |
|---|---|---|---|---|
| Thermal Conductivity | Temperature Range | | | |
| (w/mk) of Filled Resin | 50° C. | 155° C. | 230° C. | 330° C. |
| (a) Before Carbonization | 1.19 | 1.10 | 1.06 | 0.87 |
| (b) After Carbonization | 0.68 | 0.65 | 0.50 | 0.53 |

The thermal conductivity of pure MgO ranged from 60.0 to 32.0 w/mk at temperatures between 50° C. to 330° C. The thermal conductivity of the composition before and after carbonization was considerably lower.

EXAMPLE 21

This example demonstrates the regeneration capability of the flame retardants at this invention. The experiment is conducted using thermal gravimetric analysis (TGA). In this experiment, a filled phenolic cyanate resin (PT)/Magnesium Hydroxide (filler to resin weight ratio of 2 to 1) blend was carbonized as described in Example 11, converting the $Mg(OH)_2$ into magnesium oxide (MgO) and water. The carbonized sample was then immersed in boiling water for 20 hours after which it was evaluated.

No trace of $M_gO$ was found by x-ray diffraction, only $Mg(OH)_2$. The regenerated carbonized PT/$M_g(OH)_2$ system shows the same decomposition pattern as the original PT/$M_g(OH)_2$ system in TGA analysis using the procedure of Example 12. Flame retardant PT/$Mg(OH)_2$ capacity of the regenerated fire retardant was 97% of that of the original flame retardant.

What is claimed is:

1. A ballistic resistant composite comprising two or more layers, at least one of said layers being a fibrous layer comprised of a network of fibers in a matrix, and at least one of said being a fire retardant layer comprising one or more particulate fire retardant agents selected from the group consisting of compounds which exhibit on endothermic effect on exposures to heat, flame or a combination thereof dispersed in a polymeric matrix of one or more thermoplastic polymers, one or more thermosetting resins or a combination thereof.

2. A composite as recited in claim 1 wherein the fibers have a tenacity equal to or greater than about 10 g/d, a tensile modulus equal to or greater than about 160 g/d and an energy-to-break equal to a greater than about 8 J/g.

3. A composite as recited in claim 2 wherein said tenacity is equal to or greater than about 20 g/d, said modulus is equal to or greater than about 500 g/d and said energy-to-break is equal to or greater than about 15 J/g.

4. A composite as recited in claim 3 wherein said tenacity is equal to or greater than about 25 g/d, said modulus is equal to or greater than about 1000 g/d and said energy-to-break is equal than about 20 J/g.

5. A composite as recited in claim 4 wherein said tenacity is equal to or greater than about 30 g/d, said modulus is equal to or greater than about 1300 g/d and the energy-to-break is equal to or greater than about 30 J/g.

6. A composite as recited in claim 1 wherein said fibers are polyethylene fibers having a tensile modulus of at least about 1000 g/denier, a tenacity equal to or greater than about 25 g/d and an energy-to-break of at least 35 J/g.

7. A composite as recited in claim 6 wherein said tenacity is equal to or greater than about 40 g/d, said tensile modulus is equal to or greater than about 1500 g/d and said energy to break is equal to or greater than about 50 J/g.

8. A composite as recited in claim 7 wherein said tenacity is equal to or greater than about 45 g/d, said tensile modulus is equal to or greater than about 2000 g/d, and said energy-to-break is equal to or greater than about 60 g/d.

9. A ballistic resistant article comprising two or more layers, at least one of said layers being a fibrous layer comprised of a network of fibers in a matrix, and at least one of said layers being a fire retardant layer comprising a fire retardant agent selected from the group consisting of compounds which exhibit an endothermic effect on exposure to heat, flame or a combination there, dispersed in a polymeric matrix selected from the group consisting of one or more precured, completely or partially cured thermosetting resins and mixtures of one or more of said thermosetting resins and one or more of said thermoplastic resins, wherein said thermosetting resins are selected from the group consisting of precured aromatic cyanates and partially and completely cured aromatic triazines formed by curing said cyanate.

10. A composite as recited in claim 1 wherein said polymeric matrix has a char yield of at least about 50% by weight of the matrix.

11. A composite as recited in claim 10 wherein said char yield is at least about 60% by weight.

12. A composite as recited in claim 11 wherein said char yield is from about 50 to about 70% by weight.

13. A composite as recited in claim 12 wherein said char yield is from about 60 to about 70% by weight.

14. A composite as recited in claim 1 wherein said thermosetting resins are selected from the group consisting phenolic resins, polyimide resins, vinylesters resins, epoxy resins, and aromatic cyanate resins, and said thermoplastic resins are selected from the group consisting aromatic polyamides, aromatic polyesters and liquid crystalline polymers.

15. A composite as recited in claim 14 wherein said polymeric matrix is selected from the group consisting of completely or partially cured thermosetting resins, mixtures of two or more of said thermosetting resins and mixtures of one or more of said thermosetting resins and one or more thermoplastic resins.

16. A composite as recited in claim 15 wherein said thermosetting resins are selected from the group consisting aromatic cyanates and partially and completely cured aromatic triazines formed by curing said cyanates.

17. A composite as recited in claim 9 wherein said aromatic cyanates are selected from the group consisting of phenolic cyanate resins.

18. A composite as recited in claim 15 wherein said thermosetting resins are partially cured.

19. A composite as recited in claim 18 wherein the degree of cure is equal to or less than about 0.50.

20. A composite as recited in claim 19 wherein the degree of cure is from about 0.05 to about 0.50.

21. A composite as recited in claim 20 wherein the degree of cure is from about 0.15 to about 0.50.

22. A composite as recited in claim 21 wherein the degree of cure is from about 0.25 to about 0.50.

23. A composite as recited in claim 21 wherein the degree of cure is from about 0.30 to about 0.50.

24. A ballistic resistant article comprising two or more layers, at least one of said layers being a fibrous layer comprised of a network of fibers in a matrix, and at least one of said layers being a fire retardant layer comprising a fire retardant agent selected from the group consisting of compounds which exhibit an endothermic effect on exposure to heat, flame or a combination thereof.

25. A composite as recited in claim 24 wherein said inorganic compounds are selected from the group consisting of metal or non-metal hydroxides, hydrates, sulfites, bisulfites, borates, and phosphates.

26. A composite as recited in claim 25 said inorganic compounds are selected from the group consisting of hydroxides and hydrated compounds.

27. A composite as recited in claim 26 wherein said fire retardant agent is magnesium hydroxide.

28. A composite as recited in claim 9 wherein the particle size of said particulate fire retardant agents is less than about 1000 microns.

29. A composite as recited in claim 28 wherein said particle size is from about 0.001 microns to about 1000 microns.

30. A composite as recited in claim 29 wherein said particle size is from about 0.01 microns to about 500 microns.

31. A composite as recited in claim 30 wherein said particle size is from about 0.1 microns to about 100 microns.

32. A composite as recited in claim 31 wherein said particle size is from about 0.1 microns to about 50 microns.

33. A composite as recited in claim 1 wherein the amount of fire retardant is at least about 1% to by wgt based on the total weight of the fire retardant layer.

34. A composite as recited in claim 33 wherein said amount is from about 1 to about 99% by wgt.

35. A composite as recited in claim 24 wherein said amount is from about 5 to about 95% by wgt.

36. A composite as recited in claim 35 wherein said amount is from about 10 to about 90% by wgt.

37. A composite as recited in claim 11 wherein said composite comprises more than one fibrous layer, with adjacent layers aligned at an angle which with respect to the common fiber direction of the parallel fibers contained in said layers.

38. A composite as recited in claim 37 wherein said angle is from 45° to 90°.

39. A composite as recited in claim 38 wherein said angle is 90°.

40. A composite as recited in claim 1 wherein said network of fibers comprises a woven fabric.

41. A composite as recited in claim 1 wherein the volume fraction of said fibers is at least about 0.4.

42. A composite as recited in claim 1 wherein said matrix material comprises a combination of one or more thermoplastic materials and one or more thermosetting materials.

43. A composite as recited in claim 42 wherein said thermosetting resins are selected from the group consisting of vinyl esters, phenolics and epoxies, and said thermoplastic resins are selected from the group consisting of polyurethanes and polyamides.

44. A composite as recited in claim 43 wherein said matrix comprises a thermoplastic polyurethane and a thermosetting vinyl ester.

45. A composite as recited in claim 43 wherein the matrix comprises a thermoplastic polystyrene-polyisoprene-polystyrene block copolymer and a thermoset vinylester.

46. A composite according to claim 1 which further comprises at least one layer of a hard rigid material.

47. A composite according to claim 46 wherein said rigid material is selected from the group consisting of metals, ceramics, and glass reinforced polymers.

* * * * *